US009591814B2

(12) United States Patent
Collins et al.

(10) Patent No.: US 9,591,814 B2
(45) Date of Patent: Mar. 14, 2017

(54) LIGHT-WEIGHT MODULAR ADJUSTABLE VERTICAL HYDROPONIC GROWING SYSTEM AND METHOD

(71) Applicants: Fred Collins, Los Osos, CA (US); Don Hertel, Santa Maria, CA (US)

(72) Inventors: Fred Collins, Los Osos, CA (US); Don Hertel, Santa Maria, CA (US)

(*) Notice: Subject to any disclaimer, the term of this patent is extended or adjusted under 35 U.S.C. 154(b) by 0 days.

(21) Appl. No.: 14/622,387

(22) Filed: Feb. 13, 2015

(65) Prior Publication Data

US 2015/0223418 A1    Aug. 13, 2015

Related U.S. Application Data

(60) Provisional application No. 61/939,622, filed on Feb. 13, 2014.

(51) Int. Cl.
*A01G 31/02* (2006.01)
*A01G 9/16* (2006.01)
(Continued)

(52) U.S. Cl.
CPC ............ *A01G 31/02* (2013.01); *A01G 9/024* (2013.01); *A01G 9/16* (2013.01); *A01G 31/045* (2013.01); *Y02P 60/216* (2015.11)

(58) Field of Classification Search
CPC . A01G 9/02; A01G 9/022–9/024; A01G 9/14; A01G 9/16; A01G 9/24; A01G 9/247;
(Continued)

(56) References Cited

U.S. PATENT DOCUMENTS

| 4,216,617 A | * | 8/1980 | Schmidt | ............... A01G 31/06 47/62 A |
| 4,255,896 A | | 3/1981 | Carl | |

(Continued)

FOREIGN PATENT DOCUMENTS

KR    WO 2009025514 A2 * 2/2009 ........... A01G 31/045

OTHER PUBLICATIONS

Korean Intellectual Patent Office, International Search Report and Written Opinion for Application No. PCT/US2015/015932, Mail Date May 26, 2015.
(Continued)

*Primary Examiner* — Lisa Tsang
(74) *Attorney, Agent, or Firm* — SoCal IP Law Group LLP; Guy L. Cumberbatch

(57) ABSTRACT

A light-weight, modular, adjustable vertical hydroponic growing system and method of Native American design for cultivation plants and beneficial soil organisms (BSO's) in symbiotic combination. Forest-like arrays of fully rotatable and demountable grow tubes are suspended within climate-moderating greenhouses, optionally from conveyor tracks. The tubes are filled with light-weight, porous 100% inorganic grow media predominately comprised of expanded volcanic or recycled glass granules. The grow tube arrays are provided with an insulated, overhead-mounted fertigation distribution system delivering metered intermittent flows from insulated mixing and holding tanks. The flows are recycled via an insulated return piping system to maintain cool fertigation temperatures near those of natural ground water. Fertigation supply mains provided with vortex flow induction devices impart rotational momentum to flows for delivery of uniform aerated fertigation to plants and BSO's via a combination of open-tube emitters and gravity flows within grow tubes.

19 Claims, 8 Drawing Sheets

(51) Int. Cl.
*A01G 31/04* (2006.01)
*A01G 9/02* (2006.01)

(58) Field of Classification Search
CPC ...... A01G 25/09; A01G 31/00; A01G 31/001;
A01G 2031/002; A01G 2031/006; A01G
31/02; A01G 31/04; A01G 31/045
USPC .... 47/59 R, 60, 62 R, 62 A, 62 C, 62 N, 63,
47/17, 65.5, 66.1, 66.6, 67, 79, 82, 83,
47/86, 39, 44, 46, 47, 48.5, 65
IPC .................. A01G 9/02, 9/14, 9/16, 9/24, 25/09,
31/00, 31/02, 31/04
See application file for complete search history.

(56) References Cited

U.S. PATENT DOCUMENTS

| | | | |
|---|---|---|---|
| 4,268,994 A | 5/1981 | Urai | |
| 4,419,843 A | 12/1983 | Johnson, Sr. | |
| 4,454,684 A | 6/1984 | O'Hare | |
| 4,622,777 A | 11/1986 | Greene, Jr. | |
| 4,825,592 A | 5/1989 | Earls | |
| 4,920,695 A | 5/1990 | Garden | |
| 4,986,027 A | 1/1991 | Harvey | |
| 5,276,997 A | 1/1994 | Swearengin et al. | |
| 5,363,594 A | 11/1994 | Davis | |
| 5,381,625 A | 1/1995 | Wente | |
| 5,428,922 A | 7/1995 | Johnson | |
| D363,896 S | 11/1995 | Bergmann | |
| 5,555,676 A | 9/1996 | Lund | |
| 5,715,629 A | 2/1998 | Hawkins | |
| 6,178,692 B1 | 1/2001 | Graven | |
| 6,408,570 B1* | 6/2002 | Shih | A01G 31/02 47/79 |
| 6,470,625 B1 | 10/2002 | Byun | |
| 6,502,350 B1 | 1/2003 | Dick | |
| 6,840,008 B1 | 1/2005 | Bullock et al. | |
| 6,928,772 B2 | 8/2005 | Bai et al. | |
| 7,055,282 B2 | 6/2006 | Bryan, III | |
| 7,171,782 B2* | 2/2007 | Felknor | A01G 9/102 47/65.5 |
| 7,516,574 B2 | 4/2009 | Gottlieb et al. | |
| 7,785,207 B2 | 8/2010 | Henry et al. | |
| 7,845,112 B2 | 12/2010 | Felknor | |
| 8,065,833 B2 | 11/2011 | Triantos | |
| 8,136,296 B2 | 3/2012 | Hogan | |
| 8,225,549 B2 | 7/2012 | Simmons | |
| 8,234,815 B2 | 8/2012 | Felknor et al. | |
| 8,250,809 B2 | 8/2012 | Simmons | |
| 8,291,641 B2 | 10/2012 | Triantos | |
| 8,418,403 B1 | 4/2013 | Nuttman | |
| 2003/0154652 A1* | 8/2003 | Dramm | A01G 27/005 47/48.5 |
| 2004/0049978 A1* | 3/2004 | Lips, II | A01C 23/042 47/48.5 |
| 2006/0032128 A1* | 2/2006 | Bryan | A01G 31/06 47/62 R |
| 2006/0162252 A1 | 7/2006 | Lim | |
| 2006/0168881 A1* | 8/2006 | Straumietis | A01G 31/00 47/62 R |
| 2007/0144069 A1* | 6/2007 | Gottlieb | A01G 9/023 47/82 |
| 2009/0126269 A1* | 5/2009 | Wilson | A01G 31/00 47/62 R |
| 2010/0146854 A1 | 6/2010 | Cannon et al. | |
| 2011/0061296 A1* | 3/2011 | Simmons | A01G 31/02 47/62 A |
| 2011/0258925 A1* | 10/2011 | Baker | A01G 9/023 47/65.8 |
| 2012/0066972 A1 | 3/2012 | Lin | |
| 2012/0167460 A1 | 7/2012 | Omidi | |
| 2013/0067813 A1 | 3/2013 | Storey | |
| 2013/0067814 A1 | 3/2013 | Riley | |
| 2013/0118074 A1* | 5/2013 | Fulbrook | A01G 31/02 47/62 N |
| 2013/0145690 A1 | 6/2013 | Cannon | |
| 2013/0219788 A1 | 8/2013 | VanLente | |
| 2013/0340337 A1 | 12/2013 | Kuo et al. | |
| 2014/0000162 A1* | 1/2014 | Blank | A01G 31/06 47/62 A |
| 2014/0115958 A1* | 5/2014 | Helene | A01G 1/001 47/17 |

OTHER PUBLICATIONS

"GS-Self Watering Stacking Planter." Self Watering Stacking Planter. 2011 <http://shop.hydroponicsfarming.com/GS-Self-Watering-Stacking-Planter-10810.htm>.

Polanter Hanging Vertical Gardening Flower Pot/Patio Garden Planter/Herb Gardens/Strawberry Planter/HangVegetable Pots for Herbs (Amazon.com), accessed May 12, 2015, http://www.amazon.com/dp/B00BCTUVVQ/ref=asc_df_B00BCTUVVQ3041020tag=thefind0026477-20&creative=395261&creativeASIN=B00BCTUVVQ&linkCode=asn.

* cited by examiner

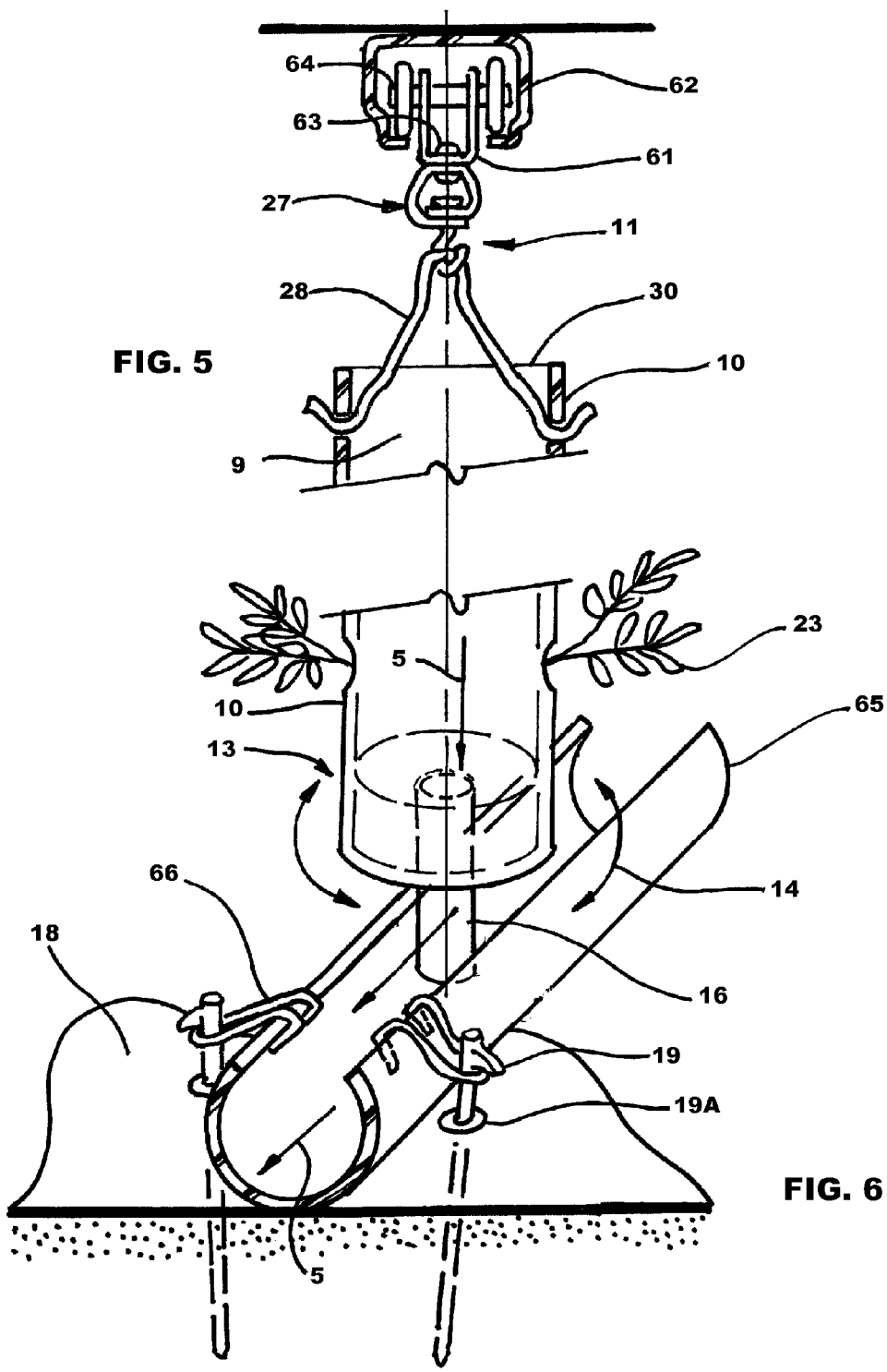

LIGHT-WEIGHT MODULAR ADJUSTABLE VERTICAL HYDROPONIC GROWING SYSTEM AND METHOD

RELATED APPLICATION INFORMATION

This patent claims priority from Provisional Patent Application No. 61/939,622, filed Feb. 13, 2014, titled NATIVE AMERICAN MODULAR ADJUSTABLE VERTICAL HYDROPONIC GROWING SYSTEM AND METHOD which is included by reference in its entirety.

FIELD OF THE INVENTION

This invention relates to vertical hydroponic (artificial soil) methods, apparatus and systems for growing plants commercially within modular greenhouse enclosures, in particular utilizing aerated liquid nutrient fertigation in combination with light-weight, granulated 100% in-organic media and vertically configured arrays of grow tubes to produce near year-round ideal plant and beneficial soil organism (BSO) growing conditions.

BACKGROUND OF THE DISCLOSURE

As a result of the decrease in the availability of inexpensive fertile farm land proximate to population centers, the increasing scarcity of water and the increasing need to find economical means of producing food to feed world population growth, the interest in vertical hydroponic growing systems has dramatically increased over the previous four decades and there presently exists many known variations, including apparatuses for commercial and home applications. Hydroponic systems are often referred to by referencing the plant root mass fertigation method used. The three variations briefly described below are all known to make use of root system containment apparatus generally known as grow tubes, which are hollow, elongated cylindrical bodies often constructed of thermoplastic material such as PVC, that are configured to hold a multitude of plants and therefore have particular relevance to the present invention:

1. Media-ponic growing systems, utilizing artificial soil, also known as substrate or grow media, in which plants are rooted, usually utilize a mixture of organic (primary component) and inorganic materials (secondary component) substituting for natural traditional soil mixtures, and 2. Aqua-ponic growing systems, with plants rooted in liquid nutrient directly, without use of substrate and relying upon direct application of liquid nutrient to plant roots by continuous emersion or by continuous contact with a film-flow or by alternatively flooding and draining, and 3. Aero-ponic growing systems, with plants rooted in air, without use of grow media and involving spraying of plant roots with a liquid nutrient aerosol within a spray chamber.

The present invention primarily represents advancement in the design of the 100% in-organic substrate-based media-ponic variation of vertical hydroponic agriculture growing systems including improvements in grow tube apparatus structure and substrate BSO ecology, grow tube fertigation systems and related modular greenhouse enclosures. Its purpose is to address a number of the previously known operational disadvantages of substrate-based growing and fertigation systems to improve their efficiency, productivity, cultivation of beneficial soil organisms, capacity for pathogen suppression, modularity and ability to be mass-produced, to accommodate optional overhead conveyor operation and to be used with modularized transportable greenhouse enclosures.

Following are examples of such known disadvantages:

1. Vertical plant container designs are most often free-standing floor supported structures focused on the growing system aspect and not configured in modular, adjustable, easily demountable and adaptable arrangements that use readily available affordable materials, that facilitate manufacture, transport, installation, maintenance, disassembly, rearrangement, and application to the widest possible variety of plants, crops and growing conditions.

2. Such vertical grow system designs may be used in greenhouse enclosures, but are not usually specifically configured to integrate with modularized, transportable portable greenhouse structures, or to permit the optional use of overhead conveyor systems in production. Floor supported designs also provide more convenient points of access for crawling pests.

3. The weight of known grow tubes combined with the dampened weight and volume of commonly used substrate mixtures of primarily organic and secondarily inorganic grow media can limit vertical growing system heights and plant quantities per unit of ground area due to overall apparatus size, weight and container cultivation, portability and accessibility issues.

4. High per-unit manufacturing, installation and maintenance costs are often required due to the complexity of custom vertical plant container designs. Additionally, custom components are often not readily available or available at an affordable cost to all potential growers.

5. Known grow tube designs are often seen as being suitable for growth of organic produce while utilizing construction materials for grow tubes, piping and fittings that are not certified as suitable for use in potable water systems ("PW" certified), that is to say, over time some of the materials most often used may leach chemicals into the nutrient stream at concentrations considered to be above safe limits.

6. Except for seed germination substrate and some ground supported "lay-flat" media filled growing bags, which may utilize 100% light-weight granular inorganic grow media such as perlite (expanded volcanic glass granules), the plant support grow media most commonly used is a mix of primarily organic and secondarily in-organic materials. The source of its organic components and the relatively large volume of substrate used for each plant can lead to conditions that support pathogen contamination and/or an undesirable imbalance of air and moisture, mineral salts, electrical conductivity and/or a pH imbalance. "Lay-flat bags are typically one crop cycle containers that are sterilized for re-use each growing cycle or discarded and do not provide an optimal, stable container ecology for the cultivation of beneficial soil organisms and pathogen suppression. Another related source of pathogen contamination can be the introduction of starter plants having been grown in soil.

7. Grow media compaction resulting from primarily organic and secondarily inorganic mix proportions and excessive root growth can occur in commonly used substrate, leading to over-saturation and lack of sufficient air within the mixture when the media volume and composition restricts efficient nutrient drainage and flow uniformity, thereby affecting plant and health and requiring expensive and frequent grow media replacement or sterilization to avoid contamination of subsequent crops.

8. Use of a closed-loop fertigation and recycling system can facilitate spread of plant diseases when excessive quantities are circulated, or when the distribution system has an excessive number of open nutrient emitter points such as at each plant grow-site, thereby multiplying potential points of entry for pests and pathogens or when the substrate retains an excessive amount of liquid nutrient between fertigation applications, or when the fertigation temperature is allowed to increase or when the recycling system does not include sufficient filtering, monitoring, analysis and adjustment to foster an optimal grow tube ecology and to counter pathogen growth and debilitating nutrient imbalances.

Use of an excessive number of nutrient emitter points and use of conventional pressure regulating drip emitters can result in maintenance and operational inefficiencies due to clogging of emitters.

As a result of these and other factors, some commercial substrate-based growing systems presently in use have limited their application to high value vining plants such as tomatoes or cucumbers that allow for a reduction of the number of substrate container grow-sites in a vertical column to one or a few. Also due to the above cited disadvantages, many commercial hydroponic growers have become focused on non-substrate-based hydroponic growing systems such as aqua-ponics and aero-ponics. Although some of the substrate-based system disadvantages noted above are mitigated by non-media based systems, others remain and new disadvantages arise; for example:

1. A relatively high level of grower skill, technology and operational knowledge is required for aqua-ponic and aero-ponic agriculture systems operation, limiting their use in underdeveloped regions.

2. Vertical system heights, use of overhead support configurations or overhead conveyance means can be constrained due to apparatus and liquid nutrient weight, thereby limiting plant densities and system adaptability.

3. A relatively high per unit cost is required for manufacturing, transport, installation, operation and maintenance due to the specialized apparatus and continuous operation of the liquid nutrient movement, containment and delivery systems. These higher per unit costs can effectively reduce the net benefit of the extremely high plant densities claimed by some systems.

4. Because of the closed loop aspect of continuous fertigation operations, disassembly and demounting of individual grow tubes and isolated component parts can be impeded.

5. High operational water quantities and continuous operation are required to avoid plant dehydration, resulting in increased energy consumption, excessive loss to evaporation and maintenance for the fertigation system. Use of a common liquid nutrient and constant recycling, combined with the large volumes of liquid nutrient required, can facilitate spread of plant diseases and algae growth. Relatively large quantities of spent nutrient are also created that must be recycled, monitored, adjusted for reuse and ultimately disposed of as waste product. The soil-less environment can support some beneficial microbial culture, but is not an optimal environment and can impede establishment of beneficial organism dominance and suppression of pathogen development.

6. With respect to aero-ponic systems, clogging of fertigation spray nozzles can reduce overall efficiency and increase maintenance costs.

7. Because of the relatively high cost of apparatus and high level of operating water usage, many of the known aqua-ponic and aero-ponic vertical hydroponic growing systems have been created primarily for home use rather than for commercial use in order to command higher purchase prices, thereby limiting the value of features they may possess to commercial growers or to less affluent growers.

Examples of growing systems in this area are disclosed in the following U.S. Pat. Nos. 4,255,896; 4,454,684; 4,986,027; 5,428,922; 5,555,676; 6,408,570; 6,840,008; 6,928,772; 8,065,833; 8,225,549; 8,250,809; 8,291,641; and 2013/0067813. Various drawbacks are presented by the prior systems, primarily their high cost and unsuitability to implement on a large commercial scale, but also their lack of focus on the creation of a growing environment suitable for cultivation of beneficial soil organisms as well as plants, lack of structural means to control the balance of air and water in the substrate, inefficient use of liquid nutrient fertigation, excessive weight, lack of mobility, lack of adaptability and flexibility to enable reconfiguration for differing greenhouse configurations, plant types, climates, grower and market needs.

Examples of growing systems in this area are also disclosed in the following Publications: (1) Ziegler, L. R., Synergy International, Inc. (Copyright 2009) published on the internet as "The Vertical Aeroponic Growing System," 18 pages—Discloses an aero-ponic growing system, with the most relevant embodiment comprised of modular stacked, cylindrical ceramic plant holding pots. The disclosed ceramic pots with vertical rotation and floor-mounted support frames would have limited flexibility for reconfiguration, be heavy and relatively expensive to construct, and result in a high cost per vertical grow-column unit; (2) Disneyland Epcot Center Hydroponics Greenhouses, Orlando, Fla., available for public tours and published on multiple internet sites, including <thephotogardenbee.com/2010/01/05/aeroponics-gardens-at-epcot-part-iii-the-land/>, discloses large diameter hollow vertical PVC "column pots," used for a hydroponics exhibiting rather than for commercial growing, suspended from overhead conveyor tracks and provided with an internal aeroponic spray fertigation system with waste discharged on the ground.

Consequently, there is a need for a vertical hydroponic growing system that is designed for both cultivation of plants and BSO's, that can easily be scaled up or scaled down in size, is highly resource efficient, is suitable for mass-production, is constructed of readily available and affordable components, including light-weight, potable water safe materials such as thin-wall, potable water (PW) certified PVC, can be readily and reliably reconfigured for multiple uses, is compatible with contemporary and emerging organic agricultural practices, fixed or overhead conveyor operations and integrates easily with conventional, modularized or transportable, modularized greenhouse enclosures.

SUMMARY OF THE INVENTION

The present application discloses a light-weight, modular, adjustable vertical hydroponic growing system and method of Native American design for the cultivation of a plurality of plants and beneficial soil organisms in symbiotic combination within climate-moderating greenhouses. The system is inspired by natural processes and the principle of thriveability wherein forest-like arrays of adjustable, fully rotatable and easily demountable thermoplastic pipe grow tubes are suspended from overhead supports for ease of cultivation, harvesting and maintenance, or optionally from overhead conveyor tracks. The grow tube assemblies are preferably filled with light-weight, porous 100% in-organic grow media predominately comprised of natural and recycled expanded glass granules. Arrays of grow tubes are provided with an overhead mounted hydroponic fertigation system delivering metered intermittent flows with fertigation recycling, insulated mixing and holding tanks and an insulated thermoplastic distribution piping system to maintain fertigation temperatures near those of natural ground water. Fertigation piping mains with vortex flow induction devices impart rotational momentum to flows for delivery of uniform aerated fertigation to plants via a combination of open-tube emitters and gravity flows. When installed in a climate-moderating commercial greenhouse, or a modular transportable greenhouse, the preferred hydroponic growing system and method offers the grower light-weight, durable, low maintenance, productive and highly resource efficient grow tubes, capable of adjustment to suit grower needs and exceeding current organic growing standards.

Since the present invention seeks to build upon the existing vertical hydroponic system knowledge base regardless of the variation of hydroponic growing system used, a basic understanding of the principle characteristics of growing systems disclosed herein is beneficial:

1. Grow Tube Apparatus Characteristics:

a. Growing apparatuses comprised of thermoplastic pipes, hollow tubes or other similar tube-like devices, wherein each of the grow tubes are provided with a central body portion, an upper end and a lower end.

b. Growing apparatuses, wherein the grow tubes are additionally provided with one or a plurality of plant receiving slits or holes cut or formed into their exterior cylindrical outer surfaces.

c. Growing apparatuses, wherein plants supported by the grow tubes are rooted in artificial soil substrate contained within the grow tubes.

d. Growing apparatuses, wherein a fabric lining is used to contain the substrate.

2. Liquid Nutrient Fertilization System Characteristics:

a. Grow tubes and/or grow tube arrays that utilize liquid fertigation systems, including those with fertigation return and recycling.

b. Grow tube fertigation delivery systems involving apparatuses comprised of an overhead pressurized liquid nutrient distribution piping or tubing system consisting of primary supply and secondary feeder piping wherein the secondary piping is provided with emitters at each grow tube site; and a tertiary gravity-flow liquid nutrient dispersion system within the grow tube body.

3. Grow Tube Support Structure Characteristics:

a. Growing apparatuses suspended from overhead framing members, including fixed support members or conveyor system tracks.

b. Suspended growing apparatuses comprised of vertically and/or horizontally-oriented arrays of two or more grow tubes each, wherein the vertically-oriented arrays may be rotatably suspended directly from horizontally-oriented overhead supports and the horizontally-oriented arrays are non-rotatably supported indirectly from the horizontally-oriented overhead supports by secondary vertically-oriented side supports.

c. Suspended growing apparatuses comprised of cylindrical grow tubes or grow tube like cylindrical planters for plant support and wherein the grow tubes may be easily demountable.

Object of the Invention

The object of the present invention is to provide a light-weight, modular, adjustable, easily demountable and transportable vertical hydroponic agricultural system and method that utilizes improved designs for vertical and horizontal media-ponic grow tubes and grow tube arrays with improved fertigation dispersion and return systems, that provide more optimal and controllable environments for cultivation of plants and beneficial soil organisms, are compatible with overhead conveyor operations, and that are constructed of readily available and cost-effective thermoplastic materials and components, mostly of standard modular manufacture, to provide growers with a more resource efficient, adaptable, economical and naturalistic, i.e., "thrive-able," growing solution for growing a plurality of plants and plant types within conventional modularized or transportable modularized greenhouse environments. It is intended primarily for use by commercial growers in industrialized countries, but also is suitable for use in less developed areas, including use by indigenous peoples in remote areas and by governmental, institutional, educational, pharmaceutical, scientific and home users.

Benefits of the systems described herein include more rapid plant maturity, more efficient nutrient absorption and pathogen suppression and therefore increased annual crop cycles, higher plant densities and increased crop yields per unit of ground area (more than five times greater than traditional greenhouse agriculture), lower water consumption (less than 20% of the water used in traditional greenhouse agriculture) and a higher degree of grower control over the multitude of variables affecting field crop production.

Although suitable for installation under open shade structures without use of climate-moderating greenhouse enclosures, when installed in a climate-moderating greenhouse or similar enclosure, the disclosed invention is capable of supporting cultivation of a near infinite variety of food, fiber, medicinal and scientific crops with enhanced nutrient absorption and pathogen resistance through cultivation of beneficial soil organisms, reduced substrate volume, reduced root mass, reduced water usage, higher productivity, lower maintenance and therefore a longer useful life cycle for the growing apparatus. When scaled down in size, the disclosed vertical hydroponic agricultural system is suitable for use in a climate-controlled laboratory environment where sterile conditions, easily monitored and measured apparatuses and controlled plant growing and BSO cultivation conditions are required to grow crops for scientific, pharmaceutical or horticultural purposes.

Following is a summary of advantages of the present invention that solve or reduce the severity of previously known problems with vertical hydroponic systems, organized according to the three principal characteristics of the present invention:

1. Grow Tube Apparatus Characteristics:

Prior Problems: Known aqua-ponic, aeroponic or media-ponic grow tube designs do not proactively address the need to provide optimal environments for the cultivation of beneficial soil organisms as a co-equal priority to the growth of the plants. Aqua-ponic and aeroponic grow tube designs are height limited by water and apparatus weight, require continuous operation, process large quantities of water, are not easily moved, disassembled or adapted to new crops or to all plant types and require skilled operators. They are not readily adapted to overhead support or to conveyor operation. Media-ponic, substrate-based grow tubes utilize mixed organic/inorganic grow media in overly large amounts per plant which can be difficult to fertigate uniformly, can become heavy when wet, can lead to contamination, low oxygen levels, excessive root development, over-saturation and necessitate frequent change outs. Existing 100% inorganic substrate are utilized in a limited, short-term and inefficient manner requiring frequent replacement or sterilization of the grow media. Grow tube designs are often too complex; require excessive use of custom manufactured elements and fittings which increase costs. The plant ports provided therein are subject to leaking and plant port plugs designed to hold plants at the port opening may damage seedlings, trap moisture and may alter pH at the grow site. Hydroponic systems utilizing thermoplastic pipe and fittings may claim suitability for use in organic growing, but in fact usually rely upon storm drainage grade, non-PW (potable water) certified pipe and fittings for their components and the proposed use of "food-grade" thermoplastic material is impractical due to costs and unavailability of many needed sizes and fittings within the "food-grade" product range.

Advantages of the Invention a. The disclosed invention provides improved, suspended, top and bottom rotatable and easily detachable, light-weight, vertically-oriented (or optionally horizontally-oriented and non-rotatable) hydroponic grow tubes comprised of readily available modular thermoplastic pipe, preferably thin-walled, "PW" certified, white PVC pipe with compatible PVC fittings and accessories of modular manufacture and like material, wherein the grow tube lengths, diameters, plant port sizes and distribution on the outer surface of the grow tubes are variable to suit grower and plant type requirements, but for most common commercial produce and berry crops the preferred diameter is approximately 4 to 6 inches [10.16 cm to 15.24 cm] and the overall length is 8 feet [2.4384 m]. The improved grow tube is provided with a cylindrical central body portion with a plurality of small, approximately 1½ inch [3.8 cm] diameter planting ports, preferably 6 to 9 per each 12 inches (30.48 cm) of central body length for the 4-inch to 6-inch diameter vertically-oriented grow tubes (yielding approximately 50 to 70 grow sites per grow tube), an open upper bell end with upper fertigation inlet reservoir within the bell portion, a removable perforated fertigation inlet basin at the bottom of the bell portion and an open lower end assembly comprised of a PVC reducer coupling and an open lower PVC extension tube of approximately 1½ inch [3.8 cm] to 2 inch [5.1 cm] diameter and of adjustable length.

b. The improved grow tubes are suspended from corrosion-resistant hanger assemblies comprised of removable hangers located near the upper edge of the grow tube's open upper bell end which are, in turn, removably hung from a swivel J-hook, or other similar hook and swivel device, that is attached to the overhead grow tube support. The hangers are provided with hooks at their lower ends to engage the grow tubes and may preferably be fabricated of a heavy-gauge wire or other rigid or semi-rigid material that, unlike a chain or thin-flexible cord remains in a generally upright position when it is lifted off of the swivel J-hook. This simply constructed assembly, in combination with the grow tube's light weight and an open lower end assembly that is suspended with loose engagement but without attachment to the fertigation return piping system below, permits convenient 180 degree top and bottom rotation with lateral restraint and removal of the grow tube for ease of cultivation, harvesting and maintenance. Damaged or defective grow tubes can be removed and replaced without shutting down operation of the row tube array.

c. The improved grow tubes are preferably erected in multiple grow tube arrays on customized grids within climate-moderating greenhouse enclosures wherein the grow tube rows are spaced a distance apart sufficient for access, cultivation and normal operations, for example 44 inches [1.1176 m] to 48 inches [1.2192 m] and wherein the grow tubes are spaced a lesser distance apart within each row, for example 22 [0.5588 m] to 24 [0.6096 m], as required to maximize grow tube quantities while maintaining sufficient clearance around each grow tube for unrestricted plant growth and access to sunlight. This distance varies dependent upon plant type and grow tube height.

d. The open upper bell end inlet reservoir of each grow tube within the grow tube array receives liquid nutrient (fertigation) intermittently and in measured quantities from an insulated, pressurized overhead fertigation distribution system via an elongated open tube emitter attached to the grow tube overhead support and directed at an angle into the reservoir, to flow against the convex side wall of the removable perforated fertigation inlet basin in order to induce agitation, aeration and spiral flow into the fertigation at the beginning of its course through the grow tube. The elongated open tube emitter resists clogging and the removable fertigation inlet basin's perforations can be varied in number and size to adjust the rate of fertigation flow into the grow tube body. The removable inlet basin serves to seal and prevent sunlight and deleterious material from entering the grow tube from above. At the lower open end of the grow tube, an open lower PVC extension tube of lesser diameter than the grow tube body removably and rotatably engages the open upward-oriented opening of a PVC Tee fitting provided as a component of the floor level fertigation return piping system for drainage and collection of excess nutrient so that it may be reused.

e. Within the improved grow tube body, the fertigation meanders by gravity-flow through a porous granular substrate consisting of 100%, in-organic grow media, preferably at least 90% of which is coarse-grain perlite (expanded volcanic glass granules), approximately 2.0 to 4.0 mm in diameter, that may optionally (especially for grow tubes of greater length) be mixed secondarily with at most 10% larger expanded recycled glass granules, approximately ¼ inch to ⅝ inch [0.6 cm to 1.6 cm] in diameter that help impede compaction of the perlite, provide improved porosity and retain moisture internally, whereas the smaller perlite granules do not retain moisture internally, thereby also providing improved porosity, but do retain nutrients on their rough, pocketed outer surface. Avoiding the use of any organic materials in the initial substrate, counter-intuitive by traditional agricultural thought, avoids introduction of undesirable soil organisms, facilitates the introduction of customized beneficial soil organism cultures and their rapid establishment for plant benefit and for pathogen resistance, thereby improving plant productivity by more efficient nutrient delivery to plant root systems which results in smaller root structures and accelerated plant growth. The relative proportion of the secondary expanded recycled glass media determines the degree of increased porosity and the use of this unique substrate combination in grow tubes of greater length can result in a uniform distribution of nutrient for the full height of the grow tube without reliance on individual plant-site emitters or an internal fertigation pipe distribution system. Where desirable for larger diameter tubes or other specific growing requirements, the improved grow tube is configured to optionally include an internal fertigation distribution pipe for a portion of its length.

f. In order to facilitate filling, handling and transport of the grow tube with the 100% in-organic substrate, a seamless, tubular in-organic filter-fabric media casing is provided to contain the substrate within the grow tube. The cylindrical, open-ended casing is of a type readily available in various diameters, in-organic non-toxic materials and lengths for use as a filter fabric to encase underground drainage pipe while permit water flow into the underground drainage pipe while preventing entrance of soil particles which might clog the pipe over time. In the improved grow tubes of this invention, the function is reversed and the substrate particles are initially retained within the PVC grow tube by the casing. The casings are cut to the length required for the grow tube application and their lower open ends are preferably tied with food-safe butcher cord or other non-toxic material in order to contain the substrate filling. When inserted into the grow tube, filled and compacted, they conform snuggly to the inner diameter of the grow tube, provide an insulating boundary layer separating the substrate from the PVC grow tube wall, creating an suitable incubation chamber for growth of beneficial soil organisms with which each newly assembled grow tube may be inoculated and preventing the substrate from escaping through plant ports prior to planting.

g. Plant seeds or offspring are also optimally germinated and grown to seedlings in 100% in-organic grow media to prevent contamination. Seedlings are placed within plant pocket voids formed behind the grow tube plant ports buy first cutting an opening in the casing exposed at the plant port, then shaping an air-filled plant pocket within the substrate media so that the seedling's roots can be gently inserted through the plant port and the hole in the casing into the substrate. Planted in this fashion, seedlings are initially protected from too much heat and quickly establish strong root systems. The air space created by the plant pockets, together with the cut edges of filter fabric, interrupt and divert fertigation flow to help prevent leakage without use of plugs and at the same time, the dripping of fertigation within the air pockets introduces additional aeration of the fertigation liquid at the point of each plant site along the length of the grow tube. The air pockets also help combat growth of mold at the base of plant stems by evaporating any trapped moisture. The perlite grow media granules have unique qualities that enable the liquid nutrients, through hydraulic cohesion, to deposit and retain minerals on the granules' outer surfaces for efficient plant absorption, without absorbing water into their air-rich inner bodies, thereby ensuring plant vitality by facilitating drainage and avoiding oversaturation, oxygen starvation or excessive root development and also by reducing the required volume of grow media per plant. Elimination of organic soil material as a component of the grow media also reduces excessive electrostatic binding of nutrients to the media, thereby facilitating nutrient absorption by plant roof systems.

h. The improved vertically-oriented and horizontally-oriented grow tubes are configured with slight differences owing to their orientations. Notably, the horizontally-oriented grow tubes are not rotatable about their central axis due to the hook and eye suspension assemblies provided at their upper open and lower closed ends. The horizontally-oriented grow tubes have a different distribution of plant ports along the length of the upper surface of the grow tube body and also have a drainage outlet at their lower ends that is connected to drainage tubing that in turn discharges into the fertigation return system. Otherwise, both function in basically the same manner as described above to create light-weight growing apparatuses that support the cultivation of beneficial soil organisms, high plant vitality and productivity with smaller root structure, less water usage and leakage, less grow media per plant and more efficient and uniform nutrient absorption and oxygen dispersion.

2. Liquid Nutrient Fertilization System Characteristics:

Prior Problems: Fertigation methods presently used in vertical media-ponic growing systems typically utilize closed loop distribution, drainage and recirculation tubing or piping in combination with nutrient reservoirs, mixing, metering and testing equipment to scientifically adjust nutrient ingredient proportions, correct imbalances and provide plants with optimal levels of nutrition, water and oxygen. Problems such as pathogen contamination, nutrient and PH imbalance, buildup of mineral salts and electrical conductivity occur more frequently than they should because of factors common to known media-ponic fertigation systems, such as:

a. Use of excessive water and nutrient volumes due to excessive media quantities, excessive root structures and excessive leaking and evaporation throughout the growing system, which results in excessive residual volumes requiring recycling and creating excessive waste product.

b. Reliance upon an excessive number of feeder tubes and emitter points for uniform distribution of nutrient to plant sites which leads to increased opportunities for pest and pathogen intrusion as well as increased maintenance, leakage and evaporation. Or, alternatively, relying on a single emitter point to fertigate a grow tube from the open upper end, without uniform internal dispersion, resulting in uneven nutrient dispersion and lack of uniform plant development and productivity.

c. Reliance upon standard light-gauge drip irrigation piping and emitter systems which are prone to breakage, clogging and high maintenance.

d. Lack of temperature control, leading to higher nutrient temperatures when exposed to solar radiation in overhead distribution systems within greenhouse enclosures, thereby promoting algae and pathogen growth and undesirable chemical interactions.

e. Lack of air inducing means to aerate, oxygenate and agitate the nutrient solution for more efficient absorption by plants, thereby increasing residual nutrient loads.

f. Lack of spiral vortex inducing means to center and agitate fertigation fluid flow within distribution piping, thereby leading to more rapid buildup of clogging solids within the system.

Advantages of the Invention a. An improved fertigation mixing and injecting apparatus comprised of a plurality of automated injection modules drawing precisely pre-mixed fertigation from a plurality of insulated holding and mixing tanks that utilize compressed air agitation to both pre-aerate the fertigation liquid and maintain suspension of nutrient materials within the liquid. The water supply is preferably drawn from a well or other below-grade water source at ground water temperature, with main supply piping kept below grade and insulated upon entrance to the head house facility. The insulated fertigation holding and mixing tanks are preferably constructed with their bottom portions set below grade to cool naturally by contact with ground water level temperatures and interior fertigation supply and return piping is insulated to maintain fertigation at near ground water temperature for delivery to the grow tubes, thereby cooling plant's root structures when the atmosphere is warm and warming them when it is cool. This also provides a fertigation temperature range that is more natural to the plant thereby improving nutrient uptake and plant health.

b. An overhead pressurized, insulated fertigation distribution system, preferably of PW certified PVC, with modular fittings and accessories of like material, is provided with a spiral vortex inducing device in its main line, downstream from each irrigation zone's control valve, thereby incorporating a spiral flow memory to the fertigation liquid that centers the flow, agitates, contributes to aeration and to the reduction of clogging. A spent fertigation return piping system is provided with openings restricted to those required at each grow tube. The returned fertigation is pumped from a collection sump basin through a particle and salts removal filter and insulated return piping to an insulated holding and mixing tank, provided with compressed air agitation, where it is tested and analyzed to determine nutrient amendments needed so that it can be reused.

c. Improved overhead emitter assemblies are provided, each comprised of an elongated open-tube fertigation emitter fed from multi-head distribution fittings and attached to the overhead support member by an adjustable bracket to direct precisely metered liquid nutrient flow into each grow tube's open upper bell end inlet reservoir at approximately the same time during each intermittent fertigation application.

d. Improved grow tube design as described herein utilizing internal gravity-flow fertigation and aeration dispersion methods, capable of uniformly delivering aerated fertigation flow to 50 or more grow sites on one 8 foot (2.4384 m) long vertically-oriented grow tube from one overhead emitter point and which also provides an optimal air, water and nutrient supply for the cultivation of beneficial soil organisms within the grow tube, producing vigorous plant growth with less media, less excess nutrient retention, less leakage, less water volume and less residual nutrient to be recycled. Due to the improved efficiency of the grow tube design for symbiotic cultivation of both beneficial soil organisms and plants, fertigation times are reduced to approximately 4 to 8 short-duration daily doses, depending upon plant type and environmental conditions within the greenhouse. Each dose is metered to fully fertigate all plant sites within each grow tube with minimal residual flow.

3. Grow Tube Support Structure Characteristics:

Prior Problems: Ground level support designs facilitate access by pests, limit overall height and access to vertical plant arrays, and result in shading from structural support frames. Known overhead support systems do not incorporate modular secondary support elements and attachments that readily integrate in a modular fashion with conventional, modularized or transportable modular greenhouse primary structural frames. Plant supporting grow tubes, are not readily dimensionally variable, adjustable and easily demountable for flexible adaptability of grow tube size, length, plant and row spacing or for portability, installation and maintenance, nor do they permit full rotation of suspended vertically-oriented grow tubes with lateral restraint at top and bottom to facilitate cultivation, harvesting or variation of solar orientation, nor do they provide grow tube array adaptability to overhead conveyor production methods.

Advantages of the Invention a. The present invention utilizes the structural capacity of modularly spaced greenhouse primary roof framing members, such as the reinforced bottom cords of steel roof trusses, for support. Rows of grow tube arrays are suspended below greenhouse primary roof framing and above the floor level by means of variably sized and spaced secondary linear structural members, such as steel "C" channels, adjustably attached to the bottom roof truss cords, set parallel to one another and at right angles to the primary roof framing members so as to form vertical planting rows. The secondary linear members are fabricated of spliced together segments to facilitate disassembly and transport. By orienting the longitudinal axis of the greenhouse, which would typically align with that of the secondary linear planting row members, to coincide with the optimal solar orientation, the suspended rows of grow tubes are likewise favorably disposed to a balanced distribution of daily sunlight from morning to night.

b. Thermoplastic pipe grow tubes (preferably 4 inch [10.16 cm] to 6 inch [15.24 cm] diameter thin-wall "PW" certified PVC (for common produce and berry crops) are chosen to comprise the plant support means because of their low cost, easy workability, wide availability in variable modular diameters with a large assortment of matching modular fittings. Multiple grow tubes are optionally arranged in vertically and/or horizontally-oriented arrays of two or more grow tubes each, wherein the vertically-oriented grow tube arrays are directly removable and rotatably supported from the overhead secondary linear row members and the horizontally-oriented grow tube arrays are indirectly and removably supported from vertical linear structural members suspended separately at intervals from the overhead secondary linear members. Vertically-oriented grow tubes are thereby supported by rotatable means at both the top and bottom with lateral restraint to facilitate planting, cultivation, sampling of media, monitoring for pests or disease, response to air circulation, harvesting and adjustment of plant orientation relative to the light source. Attachment hardware is generally of standard corrosion-resistant manufacture and is easily demountable for ease of transport, assembly, disassembly, cultivation, maintenance and harvesting.

c. Thermoplastic fertigation distribution piping is also supported by the overhead primary, secondary and suspended vertical linear members. The PVC fertigation return piping, positioned to receive grow tube drainage at the greenhouse floor level has direct contact with and is supported by sloping floor surface or shimmed to provide slope. This return piping is aligned with the grow tube array rows above. The grow tube array rows are suspended above the return piping with loose engagement for lateral restraint but with no direct attachment thereto. Instead, the return piping is provided with upwardly oriented PVC Tee fittings, which loosely and rotatably receive and retain the grow tube's open lower end extension tubes. The fertigation piping utilizes conventional fittings and assemblies which facilitate assembly, disassembly and transport.

d. The improved vertical hydroponic grow system support means disclosed above is adaptable to overhead conveyor production methods by installing a conveyor system with a chain-driven "C" channel overhead support track to serve in place of the linear overhead C-channel row support member described above. The removable and rotatable grow tube hanger assemblies are attached to rolling conveyor system track hangers in lieu of the C-channel row support members. At the floor level, the PVC fertigation return piping system is modified to include a continuous slot at the upper surface of the return pipe to loosely engage the grow tube's open lower end extension tubes and permit the grow tubes to move along the conveyor system path.

e. Where such an overhead conveyor production method is used and the overhead fertigation distribution emitters are in fixed positions, the conveyor system movement must be calibrated so that when movement stops, each grow tube fertigation inlet reservoir is positioned below a stationary emitter.

f. The improved vertical hydroponic system support means disclosed is adaptable for use in factory-assembled transportable greenhouse modules similar to steel framed modular buildings commonly used for school classrooms or residential dwellings, wherein such modules are provided with raised floor systems and configured for transport over highways or railways to remote sites where they may be connected to a plurality of similar modules to form larger modular greenhouse enclosures.

g. The improved vertical hydroponic system support means disclosed may also be prefabricated in a modular demounted configuration suitable for packaging and transport. Grow tubes may be shrink-wrapped for transport including grow media and planted seed or seedlings. In combination with factory-assembled transportable greenhouse modules such as described above, also designed to be demounted for transport, the entire growing system, including growing tubes, fertigation system, support structure and greenhouse enclosures would be suitable for transport in standard steel trucking, shipping, train and air-freight cargo containers.

In consideration of the above, a first light-weight, modular hydroponic grow tube system for cultivation of a plurality of plants and beneficial soil organisms in symbiotic combination, including a plurality of grow tube assemblies. Each grow tube assembly comprises a vertically- or horizontally-oriented grow tube suspended from an overhead support by an easily demountable hanger assembly. The grow tube has an open upper end fertigation inlet reservoir, a plurality of plant ports in an outer surface thereof, and a lower outlet assembly for fertigation drainage including an outlet pipe rotatably and demountably restrained within an inlet of a fertigation return system. A light-weight, porous grow media within a filter-fabric casing is positioned within the grow tube.

In the first system, each grow tube may be vertically-oriented and the plurality of plant ports are provided on its vertically-oriented outer surface. Alternatively, each grow tubes is horizontally-oriented and the plurality of plant ports are provided on an upper portion of its horizontally-oriented outer surface.

The grow tubes may be fabricated of modular thermoplastic thin-wall pipe and fittings, including customized fittings disclosed herein, of variable modular dimensions. The thermoplastic material used for the thin-wall pipes and fittings may be a Poly-Vinyl-Chloride (PVC) composition formulated and tested so as to be certified by the National Science Foundation (NSF) as safe for potable water, i.e. as "PW" labeled pipe and fittings, thereby facilitating certification for "organic" growing and achieving a higher level of health safety by reducing levels of unwanted chemical intrusion by leaching throughout the hydroponic grow tube apparatus.

In a preferred embodiment, the open upper end fertigation inlet reservoir is formed by either a standard bell end in the case of a vertically-oriented grow tube, or by an upper bell end portion of a standard elbow fitting in the case of a horizontally-oriented grow tube, the bell end in each case, or a pipe fitting of similar function being of slightly greater diameter than the diameter of the modular thin-wall grow tube pipe below the bell. In this embodiment, a removable, perforated fertigation inlet basin, also fabricated of thermoplastic in compatible modular thin-wall pipe dimensions, may be inserted into the open upper end fertigation inlet reservoir so that it rests upon an internal basin support ledge created at the juncture of the greater diameter upper open bell end and the lesser diameter lower grow tube pipe and forms the bottom portion of the fertigation inlet reservoir. The fertigation inlet basin is generally cup-shaped, fabricated of thin-wall thermoplastic, and has an outer diameter and shape of modular size to fit snugly within the inner diameter of the bell end of the modular grow tube pipe or elbow fitting.

Desirably, the fertigation inlet basin comprises: a cylindrical upper wall section with rounded upper edge, a downward sloping concave outer bottom surface, a circular inner bottom trough with a plurality of bottom trough perforations of variable size and number, and a centrally positioned bottom hole, provided with a removable hole plug to aid in removal of the perforated fertigation inlet basin. The centrally positioned bottom hole may optionally be provided with: an integral slip-slip pipe fitting below the centrally positioned bottom hole, a perforated internal fertigation distribution pipe of variable length, with an upper open end and a closed lower end, fitted into the slip-slip fitting to equalize fertigation distribution within larger grow tubes.

In the first system, the lower bottom outlet assembly is preferably formed by either a reducer bushing in combination with an open end extension pipe of variable length in the case of a vertically-oriented grow tube, or by an off-set reducer coupling with fertigation outlet assembly connected to drainage tubing in the case of a horizontally-oriented grow tube. In either case the open end extension pipe is of lesser diameter than the diameter of the grow tube pipe, and the extension pipe may optionally be loosely engaged by an inlet fitting of a fertigation return system.

Preferably, the light-weight, porous grow media is comprised of 100% in-organic material, predominantly of expanded volcanic glass granules (perlite). Alternatively, perlite may be mixed with a lesser portion of expanded recycled glass granules to improve drainage and moisture retention. Consequently, when initially assembled within a filter-fabric casing within the grow tube, the mixture provides a sterile and long-lasting granular artificial soil within which air, water and nutrients may be kept in balance to grow a plurality of plants and to facilitate establishment of a customizable culture of beneficial soil organisms within the grow media selected to support the specific crop to be grown and to suppress the establishment of pathogens.

The filter-fabric casing of the first system containing the light-weight, porous grow media is desirably fabricated of in-organic, synthetic fibers, is of seamless tubular construction having an open upper end for filling with grow media. A lower end is closed by tying with a non-toxic material such as food-safe butcher cord, by sewing with synthetic fiber thread, or by seaming by other non-toxic means.

Where the grow tube is vertically-oriented, the easily demountable hanger assembly is a fully rotatable, corrosion-resistant grow tube hanger assembly comprising a swivel J-hook, or a combination swivel and hook variation thereof, attached to an overhead support member and provided with a lubricating means to facilitate smooth rotation of the swivel mechanism. A symmetrical, generally W-shaped grow tube hanger, provided with hooks at its two lower ends engages two hanger holes in the open upper end of the vertically-oriented grow tube. The grow tube hanger is fabricated of heavy-gauge corrosion-resistant wire or other rigid or semi-rigid material that, unlike a chain or thin-flexible cord, remains in a generally upright position when it is lifted, so as to hold the W-shaped hanger in a near vertical position when the W-shaped hanger is disengaged from the swivel hook, thereby facilitating its removal and replacement.

Where the grow tube is vertically-oriented, the easily demountable hanger assembly is suspended from the overhead track of a conveyor system, and wherein the fertigation return system comprises a floor level gutter, fashioned with a continuous open slot at its upper surface to rotatably and demountably receive and laterally restrain the lower bottom outlet assembly of the vertically-oriented grow tube as it moves along the conveyor path.

Where the grow tube is horizontally-oriented, the easily demountable hanger assembly is corrosion-resistant and provided at both ends of the horizontally-oriented grow tube. The hanger assemblies are removable and each comprises a projecting hook attached to vertically-oriented secondary side support element, and flanged eye bolts attached to the horizontally-oriented grow tube at both its ends by means of nylon locknut-washer combinations, provided with resilient washers to provide water-tight seals.

Preferably, each of the plurality of plant ports provided on the outer surface of the grow tube apparatus corresponds to an internal aerating plant-pocket void formed within the grow media proximate to the plant port and within an opening cut into the filter-fabric casing, for the planting of seed or seedlings or other plant propagation means.

The first system further may include an internal gravity-flow fertigation distribution system comprising an open upper end fertigation inlet reservoir which receives an intermittent stream of fertigation from a pressurized overhead fertigation distribution system emitter that aerates and agitates the fertigation. A perforated fertigation inlet basin located at the bottom of the fertigation inlet reservoir regulates fertigation flow entering the top of the grow tube pipe by adjustment of the number and size of its perforations. The outlet pipe comprises a bottom outlet assembly with an open end extension pipe, wherein the outlet assembly serves to retain the grow media casing and to funnel fertigation drainage into an optional fertigation return system.

Further, an fertigation return system may be provided which is fabricated of modular thermoplastic pipe and fittings and comprises a continuous floor level return pipe, anchored to the sloping floor level below in alignment with each row of grow tubes. A plurality of upward-oriented thermoplastic Tee fittings centered below each grow tube pipe receive fertigation return drainage and loosely and rotatably retain the lower open end extension tubes of vertically-oriented grow tubes. Alternatively, a plurality of upward-oriented thermoplastic Tee fittings are centered below, and loosely engage fertigation return manifolds of horizontally-oriented grow tubes.

Another aspect of the present application includes an improved modular hydroponic grow tube fertigation system of variable size for installation within climate moderating greenhouses. The fertigation system may be used for fertigation of modular hydroponic grow tube arrays as in the first system described above, and preferably includes:

a) a plurality of insulated fertigation supply and return mixing and holding tanks, configured with internal compressed air aeration and agitation to maintain fertigation at near ground water temperatures, b) a plurality of nutrient injection modules to precisely meter the amount of each required nutrient in the fertigation mixture, configured to provide a customized formula for each specific combination of crop type and beneficial soil organism culture to be cultivated in the grow tube arrays, c) a first subsystem of insulated, overhead, pressurized thermoplastic grow tube fertigation supply piping to maintain fertigation at near ground water temperatures, e) a plurality of fertigation main supply lines that are provided with vortex induction devices downstream of an irrigation control valve in series therewith to induce a centering rotational momentum to the fertigation flow to improve flow characteristics and agitate the flow to help avoid clogging, f) elongated open-tube emitters delivering pressurized fertigation from pressurized feeder tubes to the open upper end reservoirs of individual grow tubes to minimize clogging and to further agitate and aerate the liquid nutrient, i) a second subsystem of ground level fertigation return system piping or gutter, configured to receive return fertigation from grow tube arrays and provided with a partially underground sump basin with a sump pump connected to the third subsystem of fertigation return system piping, j) a third subsystem of insulated, pressurized thermoplastic fertigation return system piping, downstream of the fertigation sump basin, to maintain fertigation at near ground water temperatures, k) a plurality of particle and salts filters, downstream of the fertigation sump basin, to pre-condition the return fertigation for reuse and delivery to the insulated fertigation return mixing and holding tank.

The fertigation system mixing and holding tanks may be installed partially below grade to contact and equalize with cooler ground water temperatures. Furthermore, an insulated and air-temperature-conditioned fertigation mixing and holding equipment room may be provided to reduce heat gain or loss and to maintain near ground water temperatures.

In one embodiment, a factory-fabricated, modular and highway-transportable greenhouse building unit for the installation and housing of the first grow tube system and fertigation system, comprises:

a) an insulated, steel-framed structural floor module of variable standard modular building industry sizes, with wheeled undercarriage, factory prepared to house the disclosed invention and additionally provided with seamless, hygienic flooring with integral coved base, b) a moment-resisting, corrosion-resistant clear-span, open post and trussed roof greenhouse framing system, similar to known examples of modular (non-transportable) commercial greenhouse framing systems, except upgraded and configured to connect to the steel-framed structural floor module and to withstand all imposed transportation and erection loads associated with modular, transportable buildings and also factory-prepared to house the disclosed invention including being provided with overhead corrosion-resistant C-channel purlins for support of the light-weight modular grow tube arrays, c) transparent or translucent insulating greenhouse glazing, ventilation means, lighting and other elements of a contemporary commercial greenhouse system for support of climate moderation and installation and attachment of the disclosed invention.

d) a companion insulated and air-temperature-conditioned, highway-transportable head house module of conventional modular, transportable building construction, except factory-outfitted to connect to factory-fabricated highway transportable greenhouse units and factory-prepared to house the disclosed systems.

BRIEF DESCRIPTION OF THE DRAWINGS

FIG. 5 is a sectional view of a vertically-oriented modular PVC grow tube's rotatable and removable upper hanger assembly adapted for suspension of grow tube arrays from overhead conveyor system support tracks.

FIG. 6 is a partial isometric view of a vertically-oriented modular PVC grow tube's rotatable and removable bottom outlet assembly engaged by a floor-level fertigation return piping system adapted to form an open gutter to restrain and permit linear movement of the grow tube when supported by an overhead conveyor system.

DETAILED DESCRIPTION OF THE PREFERRED EMBODIMENTS

Introduction to the Detailed Descriptions: a commonly used form of a modular, climate-moderating commercial greenhouse is rectangular in plan. It utilizes corrosion-resistant metal framing members to support clear or translucent glazing panels or sheets which form vertical side walls and a pitched or curved roof. Side wall vents, roof vents and exhaust fans are provided for ventilation of the greenhouse interior. Interior fans are provided to increase air movement. Task and supplemental grow-lighting is provided. Roof framing members, usually galvanized steel open-web trusses, generally span across the short dimension of the rectangular plan and are supported by posts at each end of the trusses. The posts lie within the side walls, which are positioned at right angles to the span of the trusses and define the long dimension of the rectangular plan. Such greenhouses are provided in a range of rectangular sizes determined by the span of the trusses, which determines the greenhouse width, and the spacing between truss and post frames, referred to as "the truss bay width." The number of such truss bay widths, multiplied by the structural bay width, determines the greenhouse length. Such greenhouses are typically provided with means by which one rectangular greenhouse module may be joined to another rectangular module or to a plurality of such rectangular modules to form much larger greenhouse structures, hence the term "modular." It is also usual and beneficial for such modular rectangular greenhouses to have their long axes aligned in a generally north-south direction to equalize the exposure of greenhouse plants to the sun during the course of the day.

Vertical hydroponic agricultural growing operations within such rectangular modular greenhouses usually divide the greenhouse space into a plurality of parallel rows of plant containers separated by access aisles to facilitate planting, growing and harvesting operations. The parallel rows are typically aligned with the long axis of the modular greenhouse to equalize daily sun exposure.

The following detailed descriptions disclose an improved, mass-producible, modular, demountable and transportable vertical hydroponic growing system and method that is readily adjusted and customized to accommodate variations in crop characteristics in order to optimize productivity, that utilizes vertically or horizontally oriented PVC grow tubes in modular arrays, that is also provided with an insulated fertigation distribution and return piping system. The disclosed vertical hydroponic growing system and method are constructed of readily available and cost-effective thermoplastic materials and components, mostly of standard manufacture, to provide commercial growers with an efficient, adaptable and economical, i.e., "thrive-able," growing solutions for cultivating a plurality of plants and beneficial soil organisms in symbiotic combination within such climate-moderating commercial greenhouse environments.

Figure 1:
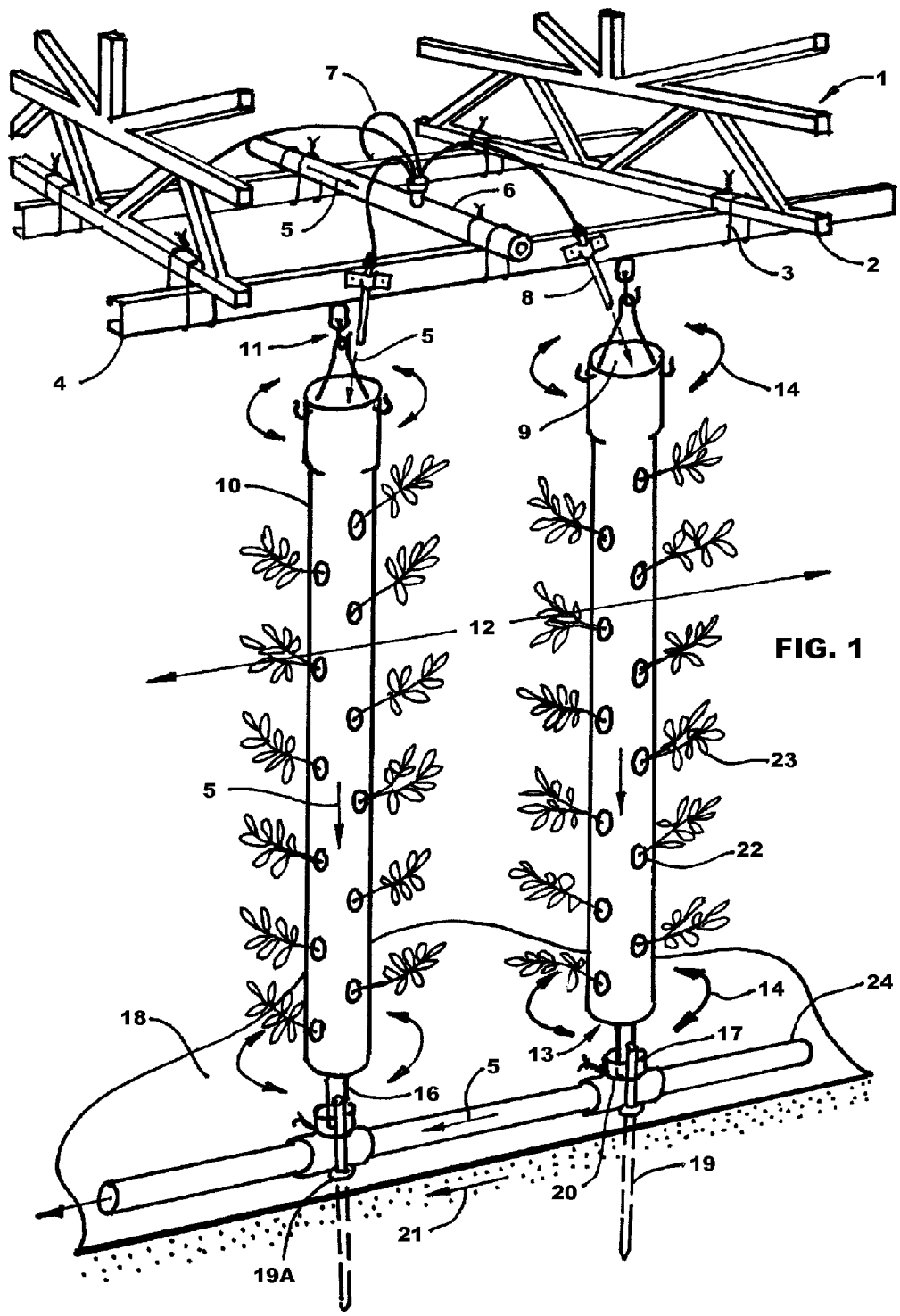
FIG. 1 is a perspective view of a vertically-oriented modular PVC grow tube array within a climate-moderating greenhouse, rotatably and removably suspended from a C-channel support track, which is adjustably hung from greenhouse roof structural members, and wherein the vertically-oriented grow tubes are also provided with an insulated overhead fertigation supply piping system and a floor-level fertigation return piping system that engages and rotatably and removably retains the lower ends of the grow tubes.
Figure 2:
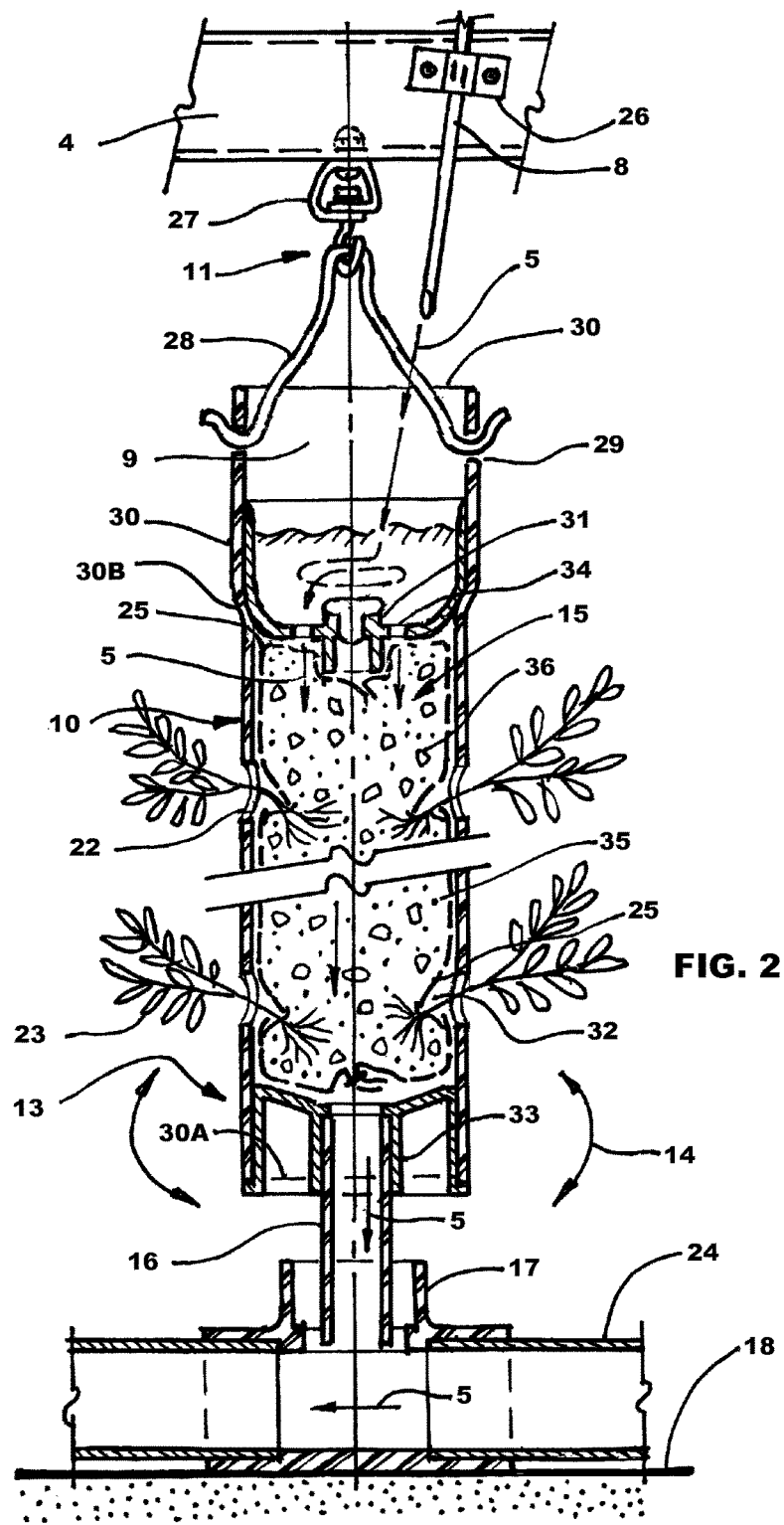
FIG. 2 is a cross-sectional view of a vertically-oriented modular PVC grow tube, preferably fabricated of thin-wall, "PW" certified PVC piping and fittings, having a rotatable and removable upper hanger assembly, an upper inlet reservoir with removable perforated fertigation inlet basin, a seamless, tubular inorganic filter-fabric media casing and a bottom outlet assembly rotatably and removably engaged by a floor-level fertigation return piping system PVC Tee fitting and wherein grow tube fertigation is provided by an overhead emitter assembly and the vertically-oriented grow tube is provided with a plurality of planting ports having plants set in planting pocket voids formed through openings cut in the media casing and wherein the media casing is filled with light-weight porous 100% inorganic growing media predominantly comprised of expanded volcanic glass (perlite) grow media.
Figure 10:
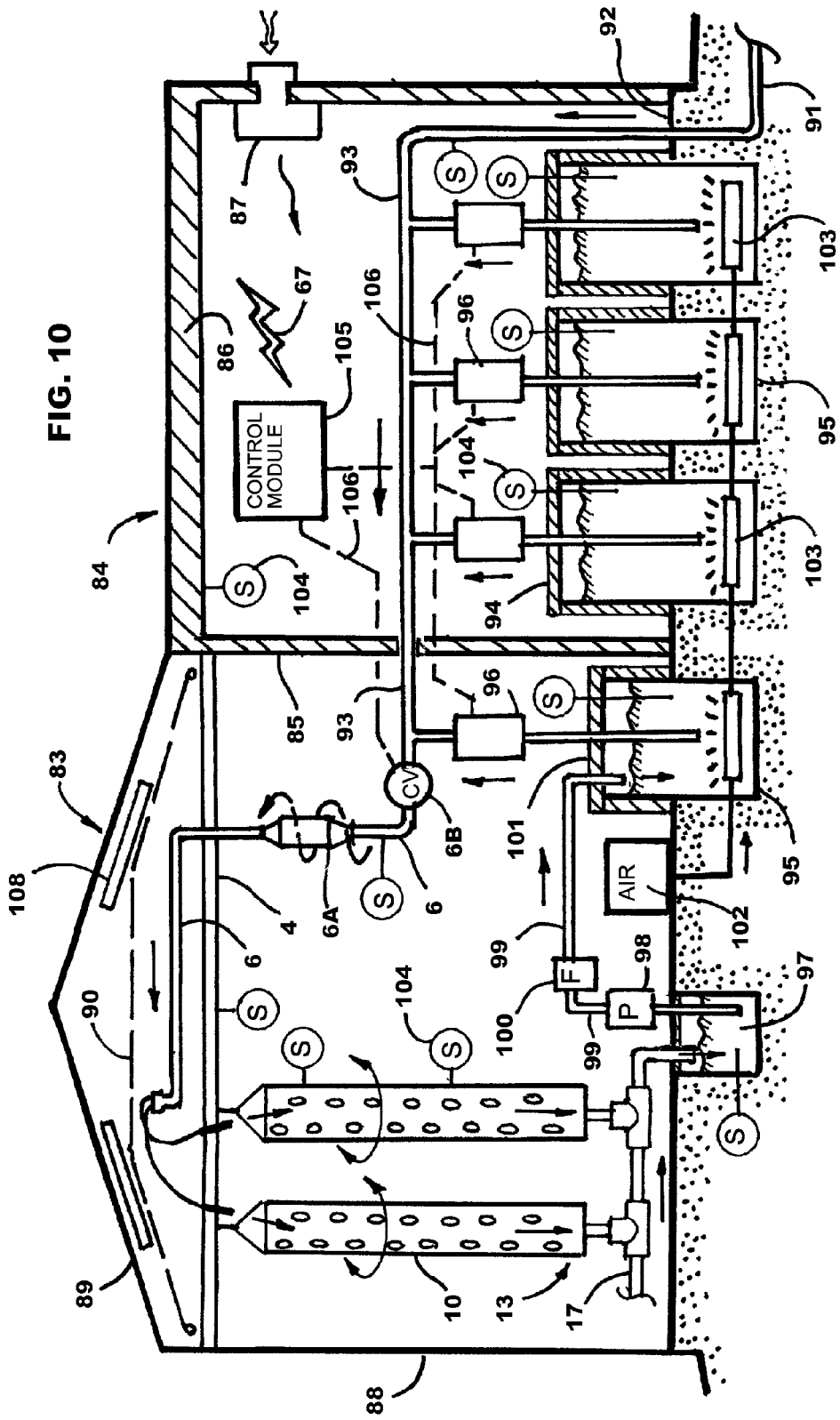
FIG. 10 is a diagrammatic sectional view of a climate-moderating greenhouse with attached insulated head house showing a schematic operational overview of the disclosed invention, including an installed vertical grow tube array, provided with an overhead insulated fertigation supply piping system with main line irrigation control valve and vortex induction device, a floor level fertigation return piping system, a partially below-grade fertigation return sump with insulated return piping, a plurality of insulated and partially below-grade fertigation mixing tanks with compressed air agitation, a plurality of metered fertigation injection modules and digitally automated control module with Wi-Fi connectivity.

As shown in FIG. 1, a plurality of vertically-oriented grow tubes 10, fabricated of thin-walled "PW" certified PVC pipe, are horizontally aligned to form a grow tube row 12 within a climate-moderating modular greenhouse 83, as shown in FIG. 10. They are adjustably suspended by corrosion-resistant, rotatable and removable grow tube hanger assemblies 11, as shown in FIG. 2, from corrosion-resistant overhead C-channel support purlins 4, which are in turn suspended from the roof truss bottom cords 2 of load-bearing roof trusses 1 by horizontally adjustable heavy-gage wire ties 3. The grow tube row 12 is preferably aligned at a right angle to the span of the load-bearing roof trusses 1. The vertically-oriented grow tubes 10 are also provided with a pressurized, thermally insulated, overhead fertigation distribution piping system 6 fabricated of insulation clad PVC pipe, and having multi-line feeders 7 to elongated open-tube fertigation emitters 8. The direction of fertigation flow is indicated by flow indicator arrows 5. The elongated open-tube fertigation emitters 8 are positioned such that pressurized fertigation solution is periodically injected into the upper inlet reservoirs 9 of the vertically-oriented grow tubes 10.

The vertically-oriented grow tubes 10, are additionally provided with a bottom outlet assembly 13, as shown in FIG. 2, which, together with the grow tube hanger assembly 11, enables grow tube rotation 14 to facilitate cultivation and harvesting. Each of the vertically-oriented grow tubes 10 is provided with internal gravity-flow fertigation through porous inorganic grow media 15, as shown in FIG. 2. The bottom outlet assembly 13, has an open lower extension tube 16 that extends downward to engage and to be rotatably and removably retained by a PVC Tee fitting 17 component of a continuous PVC pipe fertigation return system 24 and the Tee fitting 17 is anchored to the sloping greenhouse floor 18 and fixed in an upright position by a metal stake 19 with a floor seal 19A and a heavy-gauge wire tie 20 (or, alternatively, with a pipe clamp). The sloping greenhouse floor 18 has a gentle slope 21 to facilitate fertigation return drainage. The vertically-oriented grow tubes 10 are also provided with a plurality of plant ports 22 for growing of individual plants 23. The continuous PVC pipe fertigation return system 17 is aligned with and positioned directly below the overhead C-channel support purlins 4 and the grow tube row 12.

Figure 9:
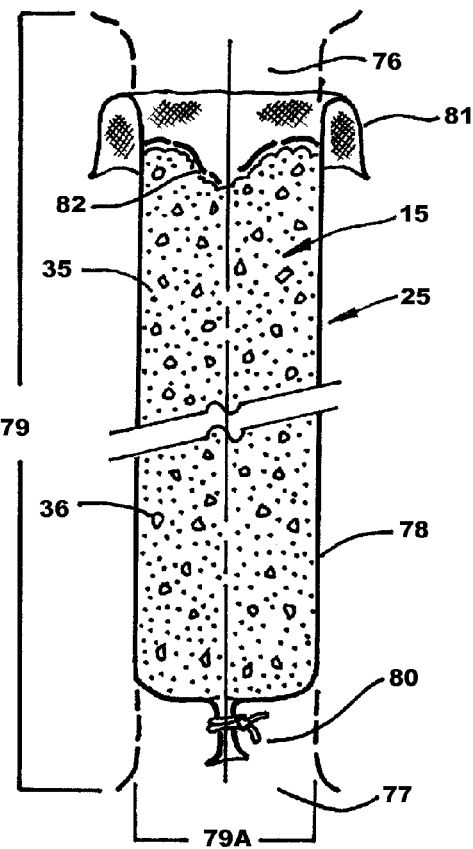
FIG. 9 is a section view of a seamless, tubular inorganic filter-fabric media casing having an open upper end and a tied, closed lower end and which is filled with light-weight porous 100% inorganic growing media predominantly comprised of expanded volcanic glass (perlite) grow media.

As shown in FIG. 2, an improved vertically-oriented grow tube 10, preferably fabricated of thin-walled "PW" certified PVC pipe and adjustably suspended from a corrosion-resistant overhead C-channel support purlin 4 by its rotatable and removable grow tube hanger assembly 11, is filled with light-weight porous 100% in-organic grow media 15 contained within a seamless, tubular in-organic filter-fabric media casing 25, as shown in FIG. 9, that serves to facilitate filling, handling, shipping, provides an insulation layer between the inorganic grow media 15 and the vertically-oriented grow tube 10. When cut and pushed in at plant ports 22 to create plant pocket voids 32 for planting of individual plants 23, it aids in the restraint of the young individual plant 23 until it is firmly rooted. Periodically the upper inlet reservoir 9 is injected with fertigation from an elongated open-tube fertigation emitter 8, attached by an adjustable bracket 26 to the overhead C-channel support purlin 4. The corrosion-resistant, rotatable and removable grow tube hanger assembly 11 is comprised of a corrosion-resistant swivel J-hook 27, bolted to the overhead C-channel support purlin 4 and a corrosion-resistant heavy-gage wire W-shaped hanger 28, which together with the vertically-oriented grow tube 10, can be lifted to clear the swivel J-hook 27 and facilitate removal and re-installation. The upper inlet reservoir 9 is provided with two W-shaped hanger holes 29 on its opposite sides Improved vertically-oriented grow tube 10 is additionally comprised of: an open upper bell end 30, with an internal basin support ledge 30B formed at the juncture of the bell end and the grow tube 10 below, a lower open end 30A, an upper inlet reservoir 9 with a removable perforated fertigation inlet basin 31, a plurality of circular planting ports 22 for growing of individual plants 23 in plant pocket voids 32 formed by cutting an opening in the filter-fabric media casing 25, a bottom outlet assembly 13 including a PVC reducer coupling 33, an open lower extension tube 16 of adjustable length that extends downward to engage and to be rotatably and removably retained by a PVC Tee fitting 17, a component of the continuous PVC pipe fertigation return system 24 which rests on the sloping greenhouse floor 18.

The periodically injected fertigation fills the upper inlet reservoir 9 and at the same time, drains by gravity flow into the light-weight porous grow media 15 through the perforated fertigation inlet basin 31. The direction of fertigation flow 5 is indicated. The rate and uniformity of flow is adjusted by the size and number of perforations 34 in the fertigation inlet basin 31, in combination with the relative porosity of the porous grow media 15 which is adjusted by varying the proportions of the predominant expanded volcanic glass (perlite) grow media 35 to an optionally added secondary expanded recycled glass grow media 36.

Figure 3:
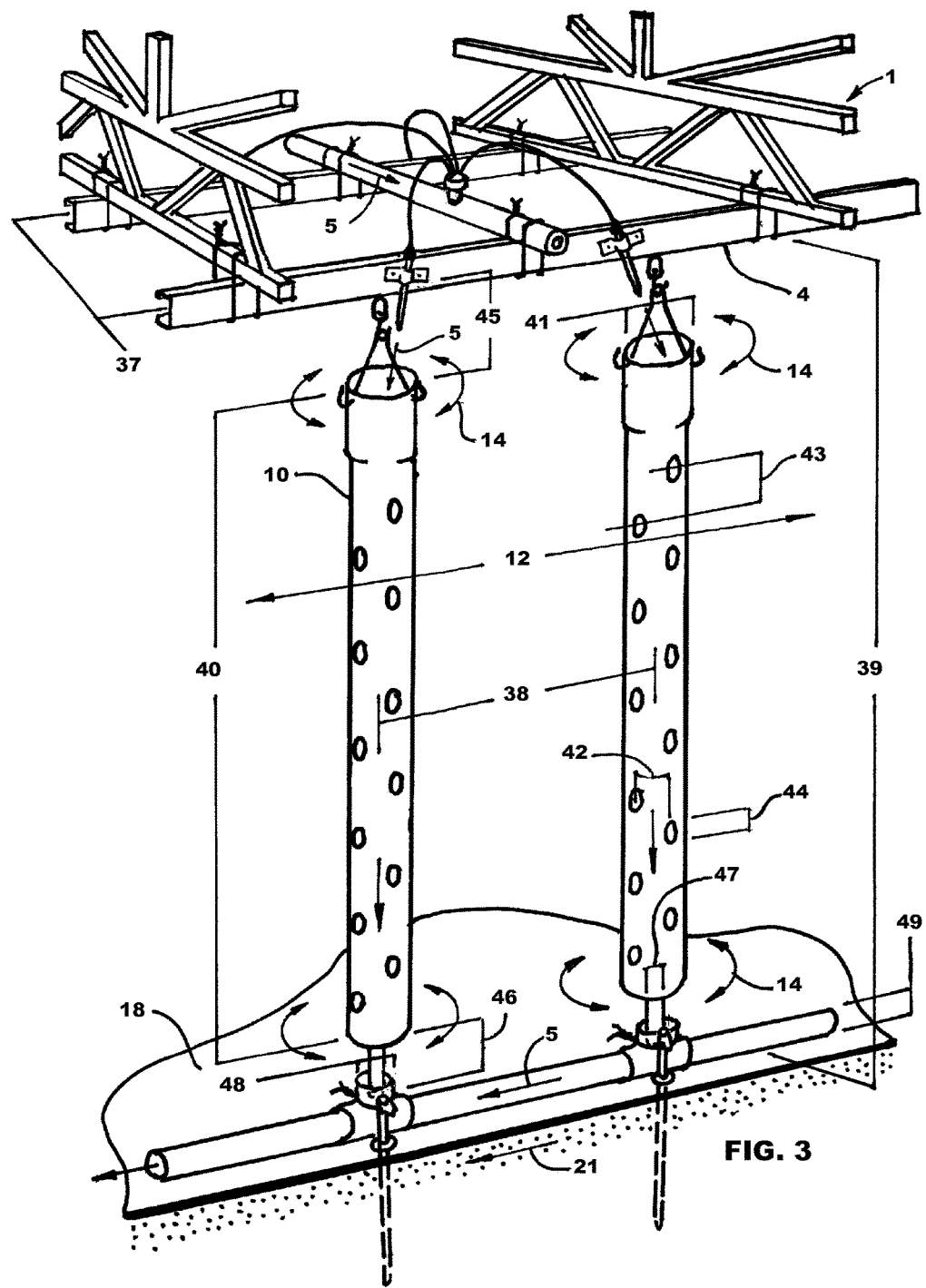
FIG. 3 is a less detailed perspective view of the vertically-oriented modular PVC grow tube array depicted in FIG. 1 identifying adjustable and customizable dimensional aspects of the invention to accommodate variations in crop characteristics in order to optimize productivity.

As shown in FIG. 3, a less detailed perspective view of the plurality of vertically-oriented grow tubes 10 as shown in FIG. 1 is presented to illustrate the modularly adjustable and customizable dimensional aspects of the invention to accommodate variations in crop characteristics in order to optimize productivity. It should be recognized by those skilled in the art that the referenced aspects would apply equally to horizontally-oriented grow tube arrays and that other variations such as a change in the materials of construction or structural support system or in the overall scale of the system can be easily accommodated by the disclosed invention's inherent adaptability. For example, the system could be scaled down for use in a climate-controlled laboratory environment where sterile conditions are required to grow crops for scientific, pharmaceutical or horticultural purposes.

The number of vertically-oriented grow tubes 10 within a climate-moderating modular greenhouse 83, as shown in FIG. 10, may be varied by adjusting the row spacing 37 between adjacent overhead C-channel support tracks 4 and the grow tube spacing 38 wherein a customized grid can be set for different crops and growing conditions. The number of plants within the climate moderated greenhouse may be varied by adjusting the truss height 39, the corresponding grow tube height 40, the grow tube diameter 41, the plant port horizontal spacing 42 and the plant port vertical spacing 43. The grow tube diameter 41, and the plant port diameter 44 may be adjusted in order to accommodate the needs of different plant types. To accommodate operational needs or variations in materials of construction, adjustments may be made to the upper suspension distance 45, the lower suspension distance 46, the extension tube diameter 47, the PVC Tee fitting diameter 48 and the fertigation return pipe diameter 49. As shown in FIG. 1, vertically-oriented grow tubes 10, C-channel support purlins 4, grow tube rotation 14, fertigation flow indicator arrows 5, the sloping greenhouse floor 18 and its gentle slope 21 are noted for reference.

Figure 4:
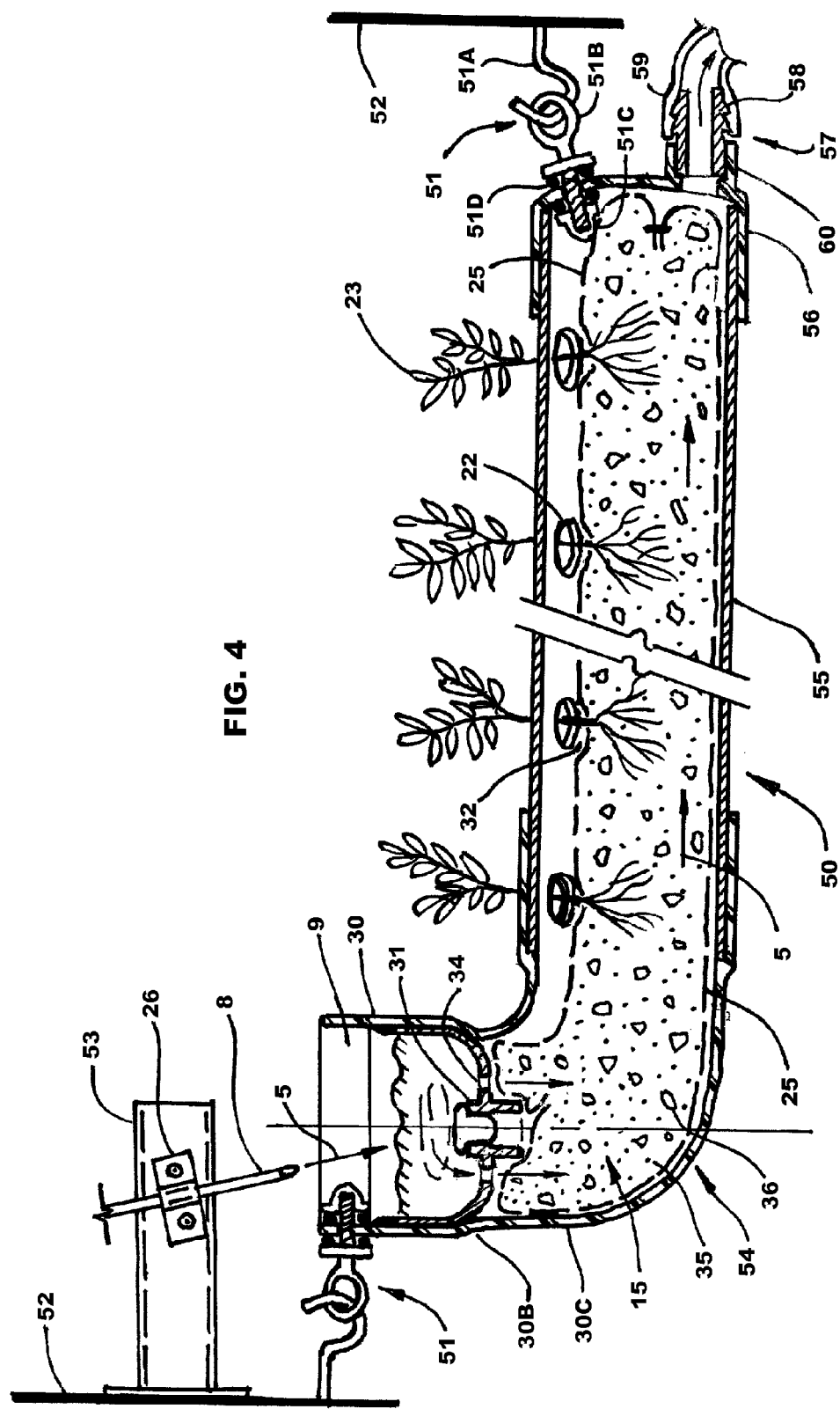
FIG. 4 is a cross-sectional view of a horizontally-oriented modular PVC grow tube, suitable for use in arrays within a climate-moderated greenhouse in a similar manner to the vertically—oriented modular PVC grow tube arrays shown in FIG. 1, preferably fabricated of thin-wall, "PW" certified PVC piping and fittings, having a detachable hook and eye support assemblies at its upper and lower ends, an upper inlet reservoir with removable perforated fertigation inlet basin, a seamless, tubular inorganic filter-fabric media casing and a lower end bottom outlet assembly connecting to fertigation return drainage tubing and wherein grow tube fertigation is provided by an overhead emitter assembly and the horizontally-oriented grow tube is provided with a plurality of planting ports having plants set in planting pocket voids formed through openings cut in the media casing and wherein the media casing is filled with light-weight porous 100% inorganic growing media predominantly comprised of expanded volcanic glass (perlite) grow media.

As shown in FIG. 4, an improved horizontally-oriented grow tube 50, fabricated of thin-walled "PW" certified PVC pipe and removably suspended by corrosion-resistant hook and eye hanger assemblies 51, from vertical support elements 52, is filled with light-weight porous 100% in-organic grow media 15 contained within a seamless, tubular in-organic filter-fabric media casing 25 as shown in FIG. 9 that serves to facilitate filling, shipping and also provides an insulation layer between the inorganic grow media 15 and the horizontally-oriented grow tube 50. Periodically, the upper inlet reservoir 9 is injected with fertigation from an elongated open-tube fertigation emitter 8, attached by an adjustable bracket 26 to a projecting support bracket 53. Each of the hook and eye hanger assemblies 51, are comprised of: a projecting hook 51A, attached to a vertically-oriented side support element 52, a flanged eye bolt 51B, a nylon lock nut-washer combination 51C and resilient washers 51D, for a water-tight seal.

Improved horizontally-oriented grow tube 50 is additionally comprised of: an open upper bell end 30, with an internal basin support ledge 30B formed at the juncture of the bell end and the elbow fitting pipe 30C below, an upper inlet reservoir 9 with a removable perforated fertigation inlet basin 31, an upper end PVC elbow fitting 54, a PVC pipe central portion 55 with a plurality of circular planting ports 22 for growing of individual plants 23 in plant pocket voids 32 formed by cutting an opening in the filter-fabric media casing 25, a lower end offset coupling 56 with a fertigation outlet assembly 57 comprised of a friction-fit drainage tube coupling 58 and drainage tubing 59, connected to the reducer coupling outlet 60 and leading to a PVC pipe fertigation return system below similar to that shown in FIG. 10.

The periodically injected fertigation fills the upper inlet reservoir 9 and at the same time, drains by gravity flow into the porous grow media 15 through the perforated fertigation inlet basin 31. The direction of fertigation flow 5 is indicated. The rate and uniformity of flow is adjusted by the size and number of perforations 34 in the fertigation inlet basin 31, in combination with the relative porosity of the porous grow media 15 which is adjusted by varying the proportions of the predominant expanded volcanic glass grow media 35 to the optional secondary expanded recycled glass grow media 36.

As shown in FIG. 5, The upper open bell end 30 of the upper inlet reservoir 9 of a vertically-oriented grow tube 10, is adjustably suspended by a corrosion-resistant, rotatable and removable grow tube hanger assembly 11, from a U-shaped, corrosion-resistant conveyor system hanger bar 61 in lieu of suspension from overhead C-channel support purlins 4 as shown in FIG. 1. The U-shaped hanger bar 61 is a component of an automated conveyor system support track 62, suitable for use in a vertical hydroponic agricultural growing operation that utilizes an automated overhead conveyor system to move a plurality of vertically oriented grow tubes along an agricultural production line for improved efficiency. The corrosion-resistant, rotatable and removable grow tube hanger assembly 11 is comprised of a corrosion-resistant swivel J-hook 27, fastened to the U-shaped hanger bar 61, with a corrosion-resistant fastener 63 which is in turn attached to the overhead conveyor track carriage 64, and thereby supporting a corrosion-resistant heavy-gage W-shaped wire hanger 28 which together with the vertically-oriented grow tube 10 can be lifted without sagging to clear the swivel J-hook and facilitate removal and re-installation.

As shown in FIG. 6, a continuous open floor level gutter 65 is fabricated from PVC pipe and is provided in lieu of the continuous PVC pipe fertigation return system 24 shown in FIG. 2 in order to accommodate the linear movement of vertically-oriented grow tubes 10 suspended from an automated overhead conveyor system as described above for FIG. 5. The bottom outlet assembly 13 of the vertically-oriented grow tube 10 has an open lower extension tube 16 of adjustable length that extends downward to engage and to be rotatably and removably retained by the floor level gutter 65. The direction of fertigation flow 5 is shown within the vertically-oriented grow tube 10 and within the open floor level gutter 65. The floor level gutter 65 is aligned and anchored to the sloping greenhouse floor 18 by metal stakes 19, with floor seals 19A and heavy-gauge wire gutter clips 66.

Figure 7:
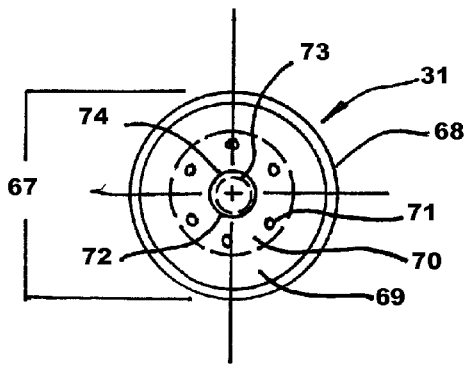
FIG. 7 is a plan view of a removable perforated fertigation inlet basin.

As shown in FIG. 7, a removable perforated fertigation inlet basin 31 is shown in plan view. The drawing of FIG. 7 is aligned with the drawing of FIG. 8 in order to show the correlation between aspects of the inlet basin 31 in plan and section view. The inlet basin 31 is preferably fabricated of thin-walled "PW" certified PVC, has an outer diameter 67 sized to fit snuggly within the inner diameter of the upper open bell end 30 of either the vertically-oriented grow tube 10 as shown in FIG. 2, or the horizontally-oriented grow tube 50 as shown in FIG. 4. The inlet basin is generally cup-shaped with a cylindrical upper wall section 68, a downward sloping concave outer bottom surface 69, a circular bottom trough 70, a plurality of bottom trough perforations 71, a raised central ring 72, which is provided with central hole 73 and removable plug 74 to aid in removal of the inlet basin 31.

Figure 8:
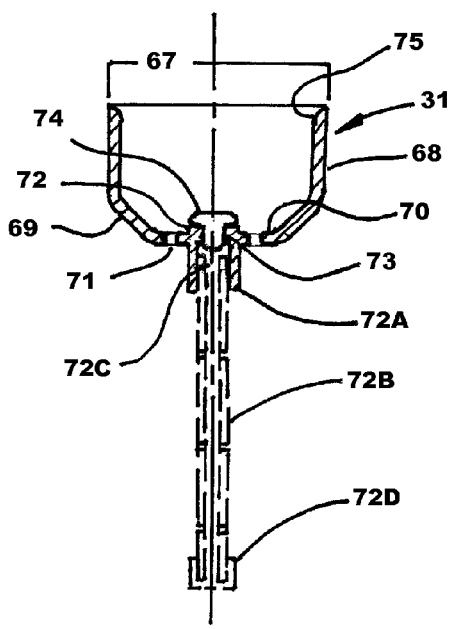
FIG. 8 is a section view of a removable perforated fertigation inlet basin showing an optional internal perforated fertigation distribution pipe.

As shown diagrammatically in FIG. 8, a removable perforated fertigation inlet basin 31 is shown in section view. The drawing of FIG. 8 is aligned with the drawing of FIG. 7 in order to show the correlation between aspects of the inlet basin 31 in section and plan view. The inlet basin 31 is preferably fabricated of thin-walled "PW" certified PVC, has an outer diameter 67 sized to fit snuggly within the inner diameter of the upper open bell end 30 of either the vertically-oriented grow tube 10 as shown in FIG. 2, or the horizontally-oriented grow tube 50 as shown in FIG. 4. The inlet basin is generally cup-shaped with a cylindrical upper wall section 68, a downward sloping concave outer bottom surface 69, a circular bottom trough 70, a plurality of bottom trough perforations 71, a raised central ring 72, which is provided with central hole 73 and removable plug 74 to aid in removal of the inlet basin 31. The upper edge 75 of the cylindrical upper wall section 68 is rounded to smooth the flow of fertigation entering the inlet basin 31. An optional slip=slip pipe fitting 72A is depended below the raised central ring 72 to receive an optional internal perforated fertigation distribution pipe 72B fashioned with an upper open end 72C and a capped lower end 72D.

As shown diagrammatically in FIG. 9, a seamless, tubular inorganic filter-fabric media casing 25 with an open upper end 76 and an open lower end 77 is seamlessly fabricated of non-toxic inorganic woven fabric 78 and cut to the length 79 required for the grow tube into which it will be inserted. The filter-fabric media casing 25 serves to facilitate filling, handling, shipping, provides an insulation layer between the inorganic grow media 15 and the vertically-oriented grow tube 10 as shown in FIG. 2. As also shown in FIG. 2, when cut and pushed in at plant ports 22 to create plant pockets 32 for planting of individual plants 23, it aids in restraint of the young individual plant 23 until it is firmly rooted.

The open lower end 77 is tied with food-safe butcher cord 80 prior to filling of the filter-fabric media casing 25 and the empty filter-fabric media casing 25 is inserted from the top down into the grow tube to be filled. The open upper end 76 is firstly given an outward fold 81 over the open upper end of the grow tube to be filled and secondly, once the filter-fabric media casing 25 has been filled with inorganic grow media 15, including the primary coarse perlite media 35 and the secondary expanded glass grow-stone media 36, the open upper end 76 is given an inward fold 82 to loosely close the filter-fabric media casing 25. When compacted with its grow tube, the media casing diameter 79A will stretch and conform to the grow tube's interior diameter for a snug fit.

As shown diagrammatically in FIG. 10, a climate-moderating modular greenhouse 83, as further described in the Introduction to the Detailed Descriptions above, is provided with an attached equipment head house 84 having insulated walls 85, an insulated roof 86 and an air conditioning system 87 in order to maintain near native ground water level temperatures within the equipment head house 84. The climate-moderating modular greenhouse 83 is also optimally provided with transparent or translucent insulating greenhouse siding panels 88 and roofing panels 89 and an overhead thermally reflective combination night-time thermal blanket and day-time shade cloth system 90. Additional interior climate-moderating and air circulation means known in the art may also be provided.

The plurality of improved vertically-oriented grow tubes 10 as shown in FIG. 1 and FIG. 2, are suspended from corrosion-resistant overhead C-channel support purlins 4, supplied with fertigation by means of a pressurized, thermally insulated, overhead fertigation distribution piping system 6, fabricated of insulated PVC pipe with a vortex induction device 6A and a main line irrigation control valve 6B. The insulation of the overhead fertigation distribution piping system 6, helps maintain the fertigation solution at near native ground water temperature, in the range of 55-65 degrees Fahrenheit, for example, as it circulates through the inorganic grow media within the vertically-oriented grow tubes 10 in order to more closely approximate plant's natural in-the-ground growing conditions. The improved fertigation system shown is provided with clean water, preferably well water, via an incoming pressurized underground water main line supply pipe 91 with water at near ground water temperature. Above the head house floor line 92, the incoming water piping 93 is insulated. Normal shut-off valves, filters, back-flow prevention devices, booster pumps, pressure reducing valves and other such devices known to the art of water distribution are not shown in FIG. 10 for clarity, but are provided as needed.

A plurality of fertigation nutrients are mixed in a plurality of insulated nutrient holding tanks 94 which are optimally installed with their lower portions 95 partially below grade to contact ground water level temperatures. Each insulated nutrient holding tank 94 is provided with a metering injection module 96 that injects pre-set amounts of each nutrient into the flow of the incoming water piping 93. A continuous PVC pipe fertigation return system 17 is provided to capture fertigation discharged from the bottom outlet assemblies 13 of the vertically-oriented grow tubes 10. The discharge from the continuous PVC pipe fertigation return system 17 is collected in a fertigation sump basin 97, automatically pumped out by a sump pump 98, through insulated PVC return piping 99 and a salt and particle filter 100 to an insulated fertigation return holding tank 101 which is optimally installed with its lower portion 95 partially below grade to contact ground water level temperatures. After testing, nutrients and water are added as needed to the fertigation return holding tank 101 to match the original fertigation specification and then injected back into the overhead fertigation distribution system 6 by means of a metering injection module 96. The insulated nutrient holding tanks 94 and the insulated fertigation return holding tank 101 are also provided with an air compressor 102 serving compressed air agitation devices 103 within each holding tank.

A variety of environmental and fertigation sensors 104 are optimally provided to monitor temperature, humidity, grow media moisture levels, fertigation characteristics, fertigation levels, flow rates, quantities and other factors affecting operation and productivity of the growing system. A centralized computerized digital control module 105 is provided to control timing and manage operational functions. It may be hard-wired 106 to key components and includes WiFi connectivity 107 to permit on-site or remote monitoring and management of the growing processes. The climate-moderating modular greenhouse 83 would additionally be provided with service and supplemental grow-lighting 108 as required by the local conditions a greenhouse operation.

Figure 11:
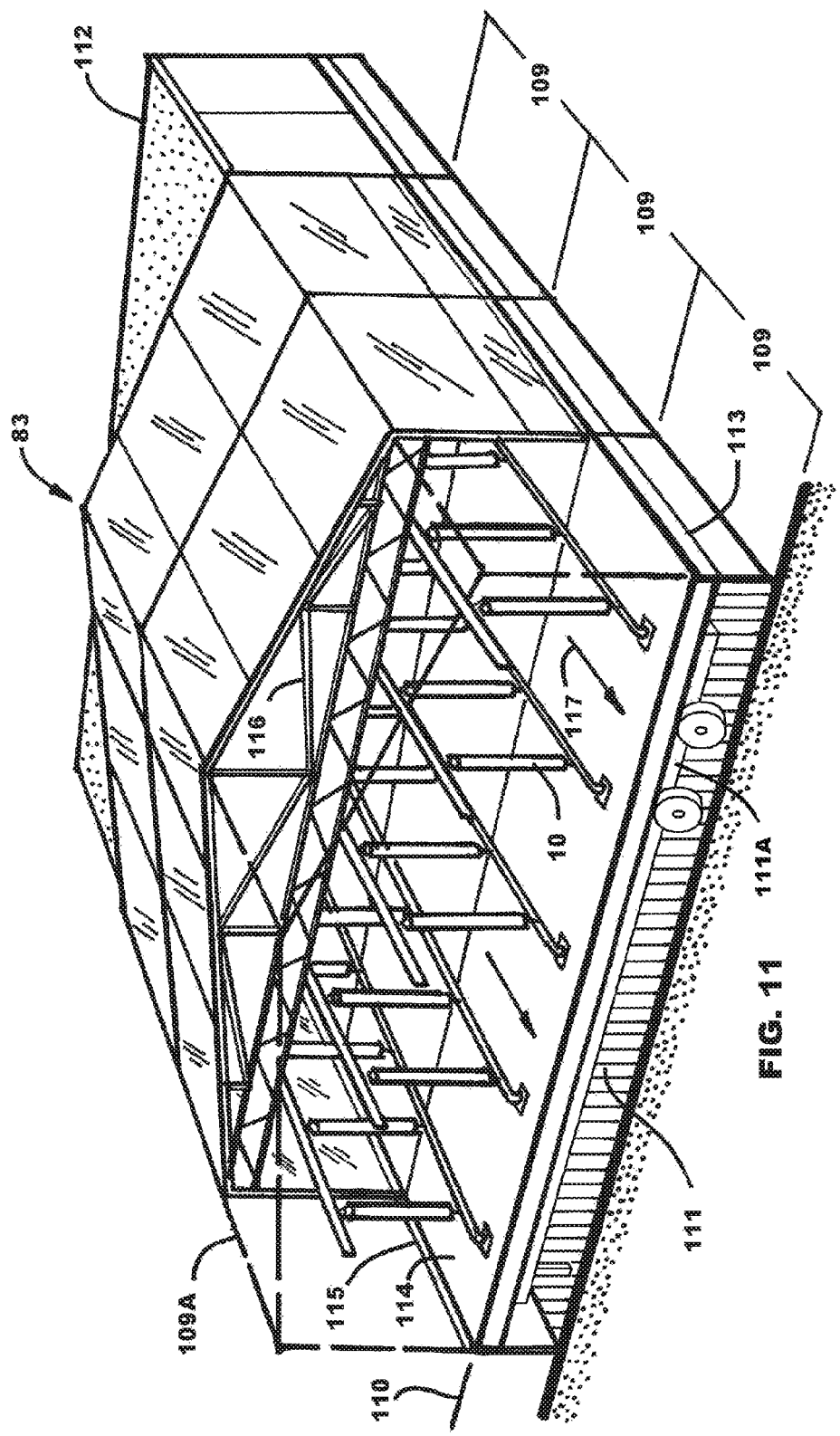
FIG. 11 is a partially cut-away perspective view of a plurality of demountable modular, highway-transportable greenhouse structures, typically factory-fabricated and suitable for installation on remote sites, each having a standard width of approximately 12 feet [3.66 m], a length of approximately 40 feet [12.19 m] and an eave height of approximately 10 feet (3.05 m) above the floor level, and which are shown in an assembled configuration with crawlspace, attached to one another side-by-side in combination with a similarly constructed demountable and highway-transportable modular head house structure at one end, to form a climate-moderating greenhouse enclosure suitable for installation of the improved grow tube arrays, insulated fertigation piping and other organic growing system components as disclosed by this invention.

As shown in perspective by FIG. 11, a plurality of improved demountable modular highway-transportable greenhouse structures 109, with module 109A shown in a cut-away view, are typically factory fabricated and installation on remote sites. Each modular greenhouse structure 109 typically has a standard width of approximately 12 feet [3.66 m], a length of approximately 40 feet [12.19 m] and an eave height of approximately 10 feet (3.05 m) above the floor level 110. The plurality of modular greenhouse structures 109 are shown in an assembled configuration with below-floor crawlspace 111, are attached to one another side-by-side in combination with a similarly constructed demountable and transportable modular head house structure 112 at one end, to form a climate-moderating modular greenhouse 83 as shown diagrammatically in FIG. 10 and suitable for installation of the improved vertically-oriented grow tube arrays, insulated fertigation supply and return systems and other growing system components as disclosed by this invention. As is known, each modular greenhouse structure is typically provided with a wheeled undercarriage 111A, for road transport and when installed on a site is supported by either temporary wood and steel jack foundations or permanent concrete foundations (not shown for clarity in FIG. 11).

The improved demountable modular greenhouse structures 109, as revealed by the cut-away module 109A, are comprised of: an insulated steel-framed structural floor 113 with seamless, hygienic flooring 114 with integral coved wall bases 115 to facilitate wash downs, a moment-resisting, corrosion resistant clear-span open post and trussed roof framing system 116 similar to those usually provided for the modular, climate-moderating commercial greenhouse described in the Introduction to the Detailed Descriptions above, except improved to (a) withstand transportation and erection loads after construction in the factory and to (b) provide attachment points and take the added loads required by the vertically-oriented grow tubes 10 and all other growing system components and utilities as shown diagrammatically in FIG. 10. The improved demountable modular greenhouse structures 109 would additionally be installed on-site with a slight floor slope 117 and prepared in the factory for quick installation of all growing system components and utilities, which because of their modular nature, can be partially pre-assembled, even to include insertion of individual plants in the vertically-oriented grow tubes so that production can begin immediately following the on-site installation of the improved demountable modular greenhouse structures 109.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to methodology flow-diagrams, additional and fewer steps may be taken, and the steps as shown may be combined or further refined to achieve the methods described herein. Acts, elements and features discussed only in connection with one embodiment are not intended to be excluded from a similar role in other embodiments.

It is claimed:

1. A light-weight, initially inorganic media-ponic modular hydroponic grow tube system for cultivation of a plurality of plants and beneficial soil organisms in symbiotic combination, including a plurality of dimensionally standardized modular grow tube assemblies that receives liquid nutrient fertigation, each of the dimensionally standardized modular grow tube assemblies comprising:
   a) a vertically suspended, vertically-oriented grow tube comprising a single elongated thermoplastic poly-vinyl-chloride (PVC) pipe of dimensionally standardized modular dimensions having an outer surface and a media-filled hollow interior filled with a 100% inorganic granular grow media, the grow tube being fully and freely rotatable about its vertical axis, the grow tube having an upper grow tube hanger that is easily demountable by lifting, without disassembly of the grow tube, from an overhead swivel support by simply lifting the grow tube,
   b) a single elongated tubular, insulating filter-fabric media casing, to retain the granular grow media, that fits within and closely against the hollow interior of the elongated PVC pipe grow tube, has an open upper end for filling with the granular grow media and a closed lower end to retain the granular grow media,
   c) a plurality of plant ports formed in, and flush with the grow tube outer surface, each of the plant ports defining an aerating plant-pocket void formed proximate to the outer surface within the media-filled grow tube by penetration of the media casing and inward displacement of the granular grow media proximate to the plant port to provide a plurality of such voids within the media-filled grow tube for planting and nurturing of plants and to aid in aeration of fertigation draining by gravity-flow through the granular grow media,
   d) an open upper end fertigation inlet reservoir fabricated of dimensionally standardized modular PVC pipe and fittings, for receipt and temporary storage of liquid nutrient fertigation from an overhead fertigation distribution piping subsystem, and a removable perforated fertigation inlet basin that is recessed and that conforms to dimensionally standardized modular PVC pipe and fitting dimensions, for graduated dispersal of the liquid nutrient fertigation into the granular grow media; and
   e) an open lower end outlet assembly, fabricated of PVC pipe and PVC pipe fittings of dimensionally standardized modular dimensions, directed into and both loosely engaged and horizontally restrained by an inlet of a fertigation return subsystem positioned below the grow tube, thereby permitting the grow tube to be both rotated freely and easily demounted from the inlet by simply lifting the grow tube,
   wherein the open lower end outlet assembly is formed by a dimensionally standardized modular PVC pipe reducer bushing in combination with an open-ended dimensionally standardized modular PVC extension pipe, the open-ended extension pipe being of lesser diameter than a diameter of the elongated dimensionally standardized modular PVC pipe of the grow tube, and whereby the extension pipe terminates within, but is not in contact with, the inlet of the fertigation return subsystem which has a greater diameter than the diameter of the extension pipe, thereby being both freely rotatable and horizontally restrained.

2. The system of claim 1, wherein the PVC pipe and PVC pipe fittings of dimensionally standardized modular dimensions used, are light-weight thin-wall types, designed for drain, waste and vent (DWV) uses and not typically certified as safe for potable water, but are manufactured by custom order wherein the thermoplastic used is a poly-vinyl-chloride (PVC) composition formulated and tested so as to be certified by the National Science Foundation (NSF) as safe for potable water.

3. The system of claim 1, wherein the open upper end fertigation inlet reservoir is formed by a bell end section of PVC pipe of dimensionally standardized modular dimensions.

4. The system of claim 1, wherein the open upper end fertigation inlet reservoir is of dimensionally standardized modular dimensions and is of slightly greater outer and inner diameters than an outer and inner diameter of the elongated PVC pipe of the grow tube below to which it joins, and the perforated fertigation inlet basin may be removeably inserted into the open upper end fertigation inlet reservoir so that it rests upon an internal basin support ledge created at a juncture of the greater inner diameter fertigation inlet reservoir and the lesser inner diameter elongated PVC pipe grow tube, thereby forming a recessed, removable bottom portion of the fertigation inlet reservoir.

5. The system of claim 4, wherein the removable perforated fertigation inlet basin is a custom-fabricated PVC fitting, manufactured to conform to dimensionally standardized modular pipe fitting dimensions to fit within the open upper end fertigation inlet reservoir, and comprises:
   a) a cylindrical upper wall section with rounded upper edge,
   b) a downward sloping concave outer bottom surface,
   c) a circular inner bottom trough with a plurality of bottom trough perforations, and
   d) a centrally positioned bottom hole on a raised central ring, provided with a removable hole plug to aid in removal of the perforated fertigation inlet basin, without disassembly of the grow tube.

6. The system of claim 1, wherein the liquid nutrient fertigation is infused with customized, crop-specific beneficial soil organisms.

7. The system of claim 1, wherein the 100% inorganic granular grow media comprises 100% expanded volcanic glass granules.

8. The system of claim 1, wherein the 100% inorganic granular grow media comprises predominantly expanded volcanic glass granules mixed with a lesser portion of expanded recycled glass granules.

9. The system of claim 1, wherein the tubular, insulating filter-fabric media casing is fabricated of in-organic, synthetic fibers, is of seamless construction, and is initially filled with the granular grow media prior to the cutting of plant ports, so that the thus encased in-organic media filling the grow tube may be inoculated with customized, crop-specific beneficial soil organisms prior to planting.

10. The system of claim 1, wherein the grow tube is supported by an easily demountable grow tube hanger, wherein the hanger has a one-piece symmetrical, general W-shape, is provided with hooks at its two lower ends to engage two hanger holes in the open upper end of the grow tube, and is fabricated of heavy-gauge corrosion-resistant metal that remains engaged and in a generally upright position when the grow tube is lifted, so as to hold the hanger in a near vertical position as it is disengaged from the swivel hook, thereby facilitating its removal and replacement without disassembling of any grow tube components.

11. The system of claim 1, further including elongated open-tube emitters delivering pressurized fertigation from the overhead fertigation distribution subsystem to the fertigation inlet basin of the upper end fertigation inlet reservoir of each of the plurality of grow tube assemblies to minimize clogging and to agitate and aerate the liquid nutrient fertigation within the fertigation inlet basin.

12. A light-weight, initially in-organic media-ponic modular hydroponic grow tube system for cultivation of a plurality of plants and beneficial soil organisms in symbiotic combination, including a plurality of dimensionally standardized modular grow tube assemblies that receives liquid nutrient fertigation, each of the dimensionally standardized modular grow tube assemblies comprising:
  a) a suspended grow tube comprising a single elongated thermoplastic poly-vinyl-chloride (PVC) pipe of dimensionally standardized modular PVC pipe dimensions having an upper inlet end and a lower outlet end, an outer surface and a media-filled hollow interior filled with a 100% inorganic granular grow media,
  b) a single elongated tubular, insulating filter-fabric media casing, to retain the granular grow media, that fits within and closely against the hollow interior of the elongated PVC pipe grow tube,
  c) a plurality of plant ports formed in the grow tube outer surface, each of the plant ports defining an aerating plant-pocket void formed within the granular media-filled grow tube by penetration of the media casing and inward displacement of the granular grow media proximate to the plant port to provide a plurality of such voids within the media-filled grow tube for planting and nurturing of plants and to aid in aeration of fertigation flowing through the granular grow media, and
  d) a fertigation inlet reservoir, conforming to dimensionally standardized modular PVC pipe and fitting dimensions, an upper inlet end of the grow tube having an upwardly-opening inlet reservoir for receipt and temporary storage of fertigation from an overhead fertigation distribution subsystem, and a removable perforated fertigation inlet basin, that is recessed and that conforms to dimensionally standardized modular PVC pipe and fitting dimensions, for graduated dispersal of fertigation into the granular grow media; and
  e) a lower outlet assembly, fabricated of PVC pipe and PVC pipe fittings of dimensionally standardized modular dimensions, at the outlet end of the grow tube and directed into an inlet of a fertigation return subsystem positioned lower than the grow tube,
  wherein the lower end outlet assembly is formed by a dimensionally standardized modular PVC pipe reducer bushing in combination with an open-ended dimensionally standardized modular PVC extension pipe, the open-ended extension pipe being of lesser diameter than a diameter of the elongated dimensionally standardized modular PVC pipe of the grow tube, and whereby the extension pipe terminates within, but is not in contact with, the inlet of the fertigation return subsystem which has a greater diameter than the diameter of the extension pipe, thereby being both freely rotatable and horizontally restrained.

13. The system of claim 12, wherein the upwardly-opening inlet reservoir of dimensionally standardized modular dimensions is also of slightly greater outer and inner diameters than an outer and inner diameter of the elongated PVC pipe grow tube below to which it joins.

14. The system of claim 12, wherein the lower outlet assembly is formed of dimensionally standardized modular PVC pipe fittings connected to drainage tubing leading to an inlet of the fertigation return subsystem positioned lower than the grow tube.

15. The system of claim 12, wherein the liquid nutrient fertigation is infused with customized, crop-specific beneficial soil organisms.

16. The system of claim 12, wherein the 100% inorganic granular grow media comprises 100% expanded volcanic glass granules.

17. The system of claim 12, wherein the 100% inorganic granular grow media comprises predominantly expanded volcanic glass granules mixed with a lesser portion of expanded recycled glass granules.

18. A light-weight, initially inorganic media-ponic modular hydroponic grow tube system for cultivation of a plurality of plants and beneficial soil organisms in symbiotic combination, including a plurality of dimensionally standardized modular grow tube assemblies that receives liquid nutrient fertigation, each of the dimensionally standardized modular grow tube assemblies comprising:
  a) a vertically suspended, vertically-oriented grow tube comprising a single elongated thermoplastic poly-vinyl-chloride (PVC) pipe of dimensionally standardized modular dimensions having an outer surface and a media-filled hollow interior filled with a 100% inorganic granular grow media, the grow tube being fully and freely rotatable about its vertical axis, the grow tube having an upper grow tube hanger that is easily demountable by lifting, without disassembly of the grow tube, from an overhead swivel support by simply lifting the grow tube,
  b) a single elongated tubular, insulating filter-fabric media casing, to retain the granular grow media, that fits within and closely against the hollow interior of the elongated PVC pipe grow tube, has an open upper end for filling with the granular grow media and a closed lower end to retain the granular grow media, c) a plurality of plant ports formed in, and flush with the grow tube outer surface, each of the plant ports defining an aerating plant-pocket void formed proximate to the outer surface within the media-filled grow tube by penetration of the media casing and inward displacement of the granular grow media proximate to the plant port to provide a plurality of such voids within the media-filled grow tube for planting and nurturing of plants and to aid in aeration of fertigation draining by gravity-flow through the granular grow media, d) an open upper end fertigation inlet reservoir fabricated of dimensionally standardized modular PVC pipe and fittings, for receipt and temporary storage of liquid nutrient fertigation from an overhead fertigation distribution piping subsystem, and a removable perforated fertigation inlet basin that is recessed and that conforms to dimensionally standardized modular PVC pipe and fitting dimensions, for graduated dispersal of the liquid nutrient fertigation into the granular grow media, e) an open lower end outlet assembly, fabricated of PVC pipe and PVC pipe fittings of dimensionally standardized modular dimensions, directed into and both loosely engaged and horizontally restrained by an inlet of a fertigation return subsystem positioned below the grow tube, thereby permitting the grow tube to be both rotated freely and easily demounted from the inlet by simply lifting the grow tube;

wherein the plurality of grow tube assemblies are mounted within a climate-moderating greenhouse installed adjacent to an insulated and air-conditioned head house, the greenhouse including:

f) at least one centering rotational momentum, vortex induction device installed downstream of each fertigation inlet basin to impart a centering rotational momentum to a fertigation flow to improve flow characteristics by rotating the flow within the overhead fertigation distribution piping subsystem to help avoid clogging, and g) the overhead fertigation distribution piping subsystem having insulated, pressurized thermoplastic pipes within the climate-moderating greenhouse to maintain fertigation at near ground water temperatures maintained within the insulated, air-conditioned head house, and to deliver the fertigation to the upper end fertigation inlet reservoirs of the grow tubes.

19. The system of claim 18, wherein both the head house and the greenhouse are factory fabricated, highway-transportable modular buildings suitable for occupancy, each provided with a wheeled undercarriage and a means of side-by-side connection in series to form a larger building of modularly variable size, including:

a) both the head house and greenhouse modular buildings having a moment-resisting, clear-span, corrosion-resistant metal post and trussed roof framing system rigidly connected to a metal-framed structural floor module to withstand all imposed transportation, erection and building code required loads associated with factory fabricated highway-transportable modular buildings, and wherein the trussed roof framing system is provided with overhead corrosion resistant structural support purlins for hanging the grow tube assemblies, and wherein the greenhouse modular building is configured for attachment of transparent or translucent insulating exterior wall and roof enclosure panels, and wherein the head house is connected to a first one of the greenhouse modular building, and at least a second greenhouse modular building is connected to the first greenhouse modular building on a side opposite the head house, and all of the greenhouses are interconnected in series to fertigation supply and return subsystems of the head house.

* * * * *